(12) United States Patent
Oetlinger

(10) Patent No.: US 8,961,060 B2
(45) Date of Patent: *Feb. 24, 2015

(54) CORNER ASSEMBLY

(71) Applicant: Blanking Systems, Inc., Grafton, WI (US)

(72) Inventor: Frank E. Oetlinger, Grafton, WI (US)

(73) Assignee: Blanking Systems, Inc., Grafton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/793,921

(22) Filed: Mar. 11, 2013

(65) Prior Publication Data

US 2014/0250822 A1 Sep. 11, 2014

Related U.S. Application Data

(63) Continuation of application No. 13/086,644, filed on Apr. 14, 2011.

(60) Provisional application No. 61/327,925, filed on Apr. 26, 2010.

(51) Int. Cl.
*F16B 12/20* (2006.01)
*F16B 7/18* (2006.01)

(52) U.S. Cl.
CPC ...................................... *F16B 7/18* (2013.01)
USPC ........... 403/259; 52/655.1; 403/231; 403/257

(58) Field of Classification Search
USPC .............. 403/231, 252, 254, 257, 259, 374.3, 403/381, 403; 248/220.1, 225.11; 52/655.1, 52/81.3, 653.1, 656.9
See application file for complete search history.

(56) References Cited

U.S. PATENT DOCUMENTS

| | | |
|---|---|---|
| 5,116,161 A | 5/1992 | Faisst |
| 5,683,198 A | 11/1997 | Leutenegger |
| 5,685,662 A | 11/1997 | Rollin et al. |
| 6,390,719 B1 | 5/2002 | Chan |
| 6,481,177 B1 | 11/2002 | Wood |
| 6,708,858 B2 | 3/2004 | Oetlinger |
| 6,712,254 B2 | 3/2004 | Oetlinger |
| 6,715,953 B2 | 4/2004 | Oetlinger et al. |
| 6,722,811 B2 | 4/2004 | Oetlinger |
| 6,769,342 B2 | 8/2004 | Oetlinger |
| 6,796,474 B2 | 9/2004 | Oetlinger |
| 6,904,837 B2 | 6/2005 | Oetlinger |
| 6,942,132 B2 | 9/2005 | Oetlinger |
| 6,997,364 B2 | 2/2006 | Oetlinger |

(Continued)

FOREIGN PATENT DOCUMENTS

| | | |
|---|---|---|
| JP | 2004-060789 | 2/2004 |
| WO | WO03070437 | 8/2003 |

*Primary Examiner* — Joshua Kennedy
(74) *Attorney, Agent, or Firm* — Boyle Fredrickson, S.C.

(57) ABSTRACT

A corner piece is provided for interconnecting frame members. The corner piece includes a first plate member defining an inner face, an opposite outer face, a first side face, an opposite second side face, and an end face. The first plate member including a bolt-receiving bore therethrough. A second plate member defines an inner face contiguous with the inner face of the first plate member, an outer face, a first side face, an opposite second side face, and an end face. The second plate member includes a bolt-receiving bore extending between the inner face and the outer face thereof along a first axis generally parallel to the inner face of the first plate member.

22 Claims, 27 Drawing Sheets

(56) References Cited

U.S. PATENT DOCUMENTS

| | | |
|---|---|---|
| 7,143,916 B2 | 12/2006 | Oetlinger |
| 7,182,235 B2 | 2/2007 | Oetlinger |
| 7,185,797 B2 | 3/2007 | Oetlinger et al. |
| 7,992,752 B2 | 8/2011 | Oetlinger |
| 2003/0226869 A1 | 12/2003 | Oetlinger |
| 2004/0036389 A1 | 2/2004 | Tsai |

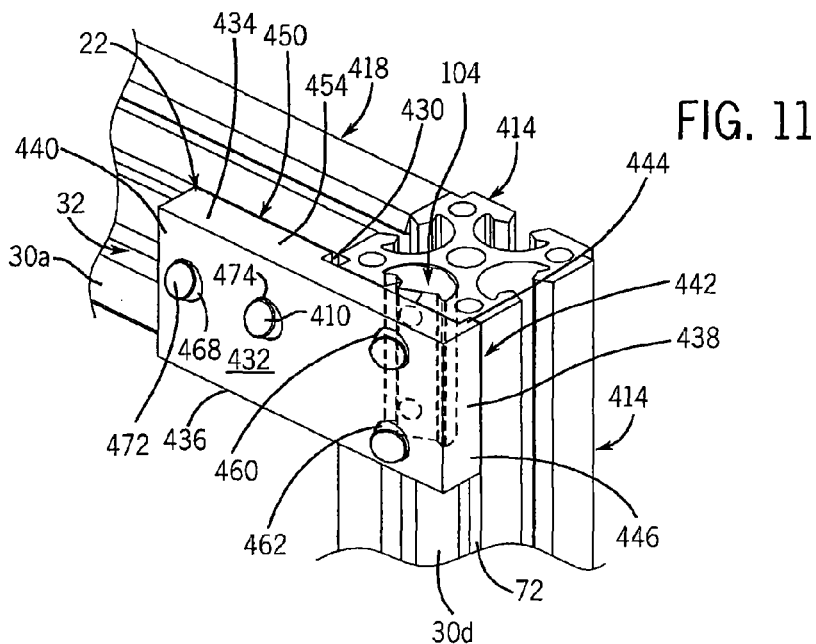
FIG. 11
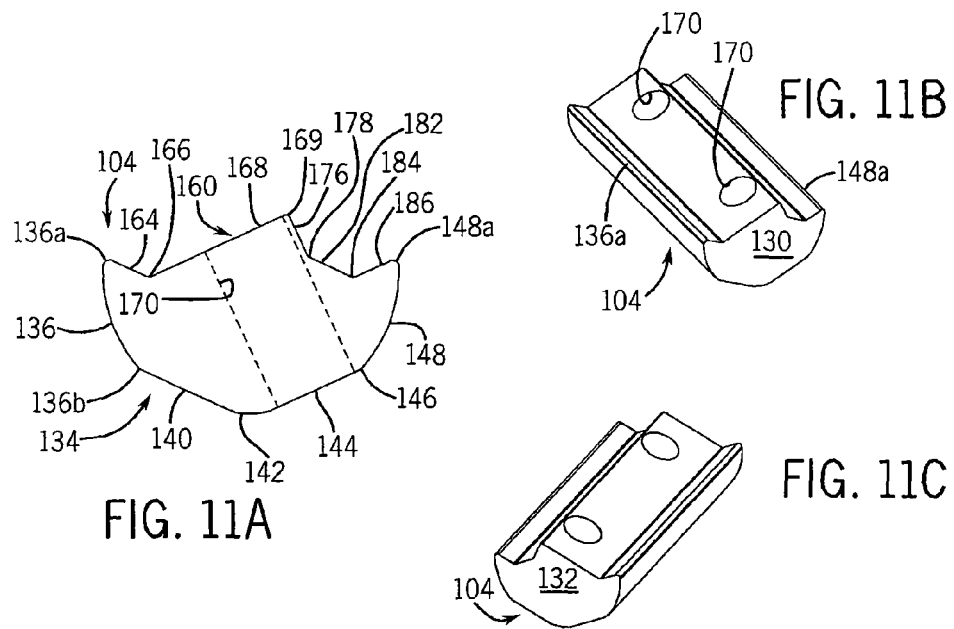
FIG. 11A
FIG. 11B
FIG. 11C

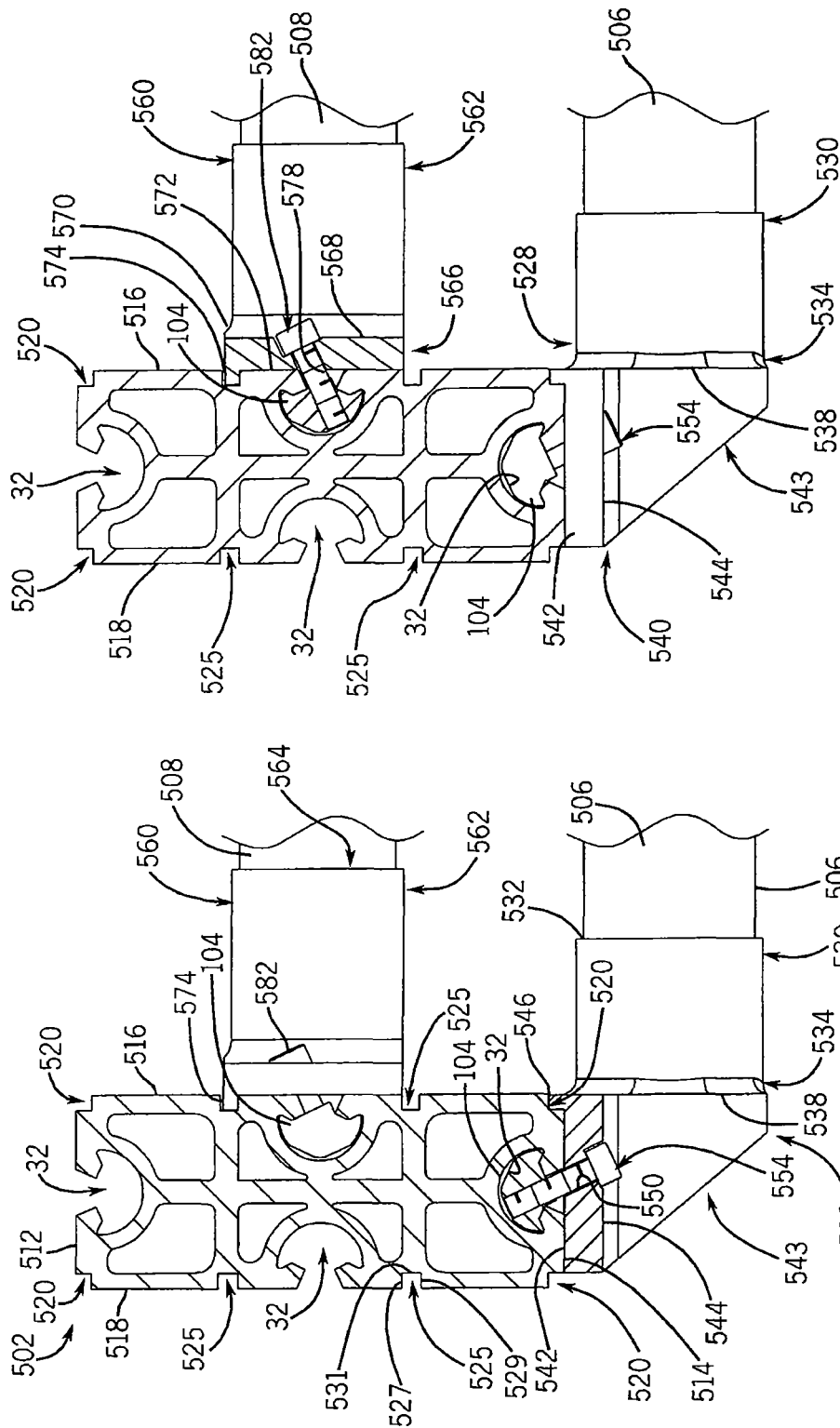

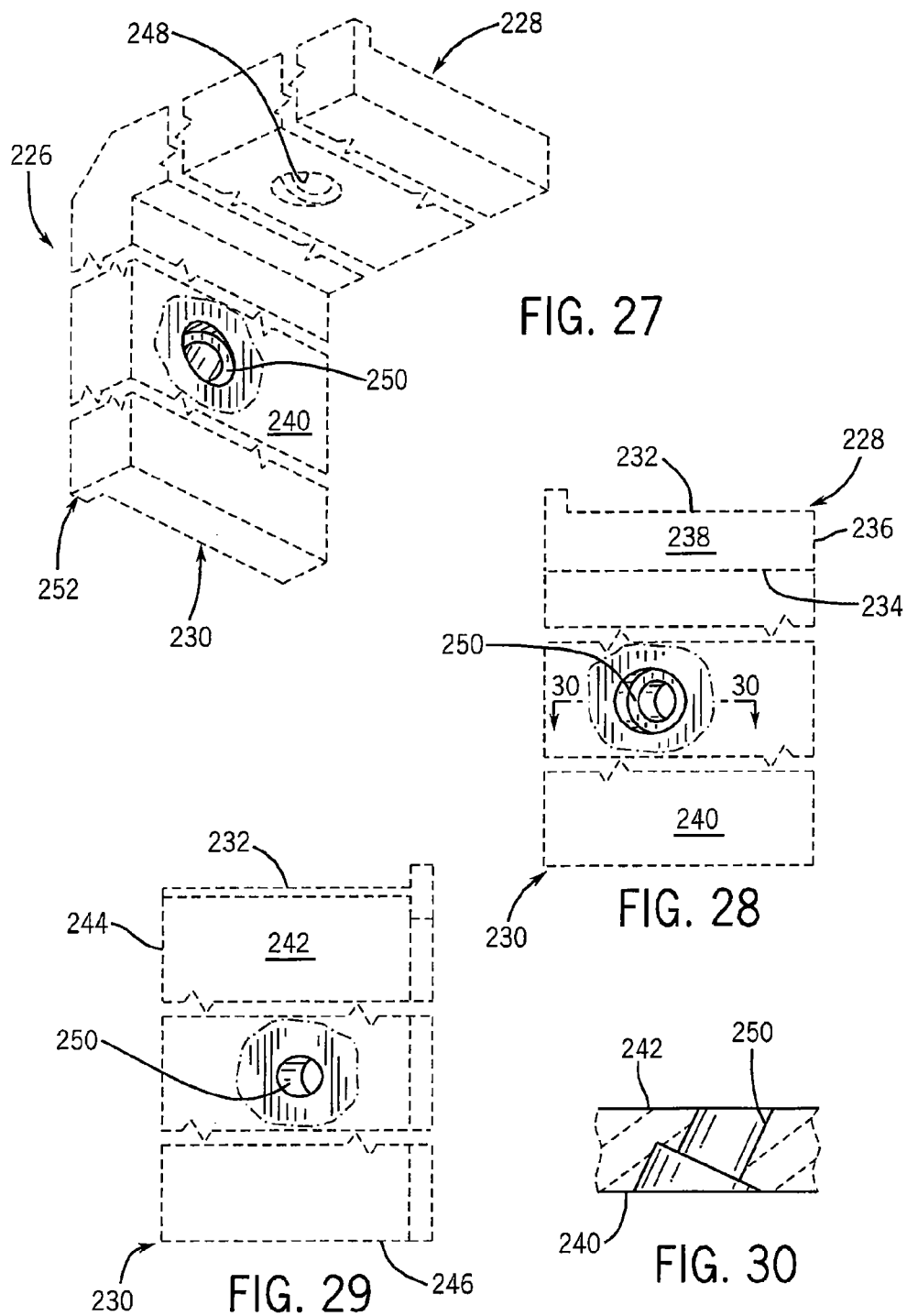

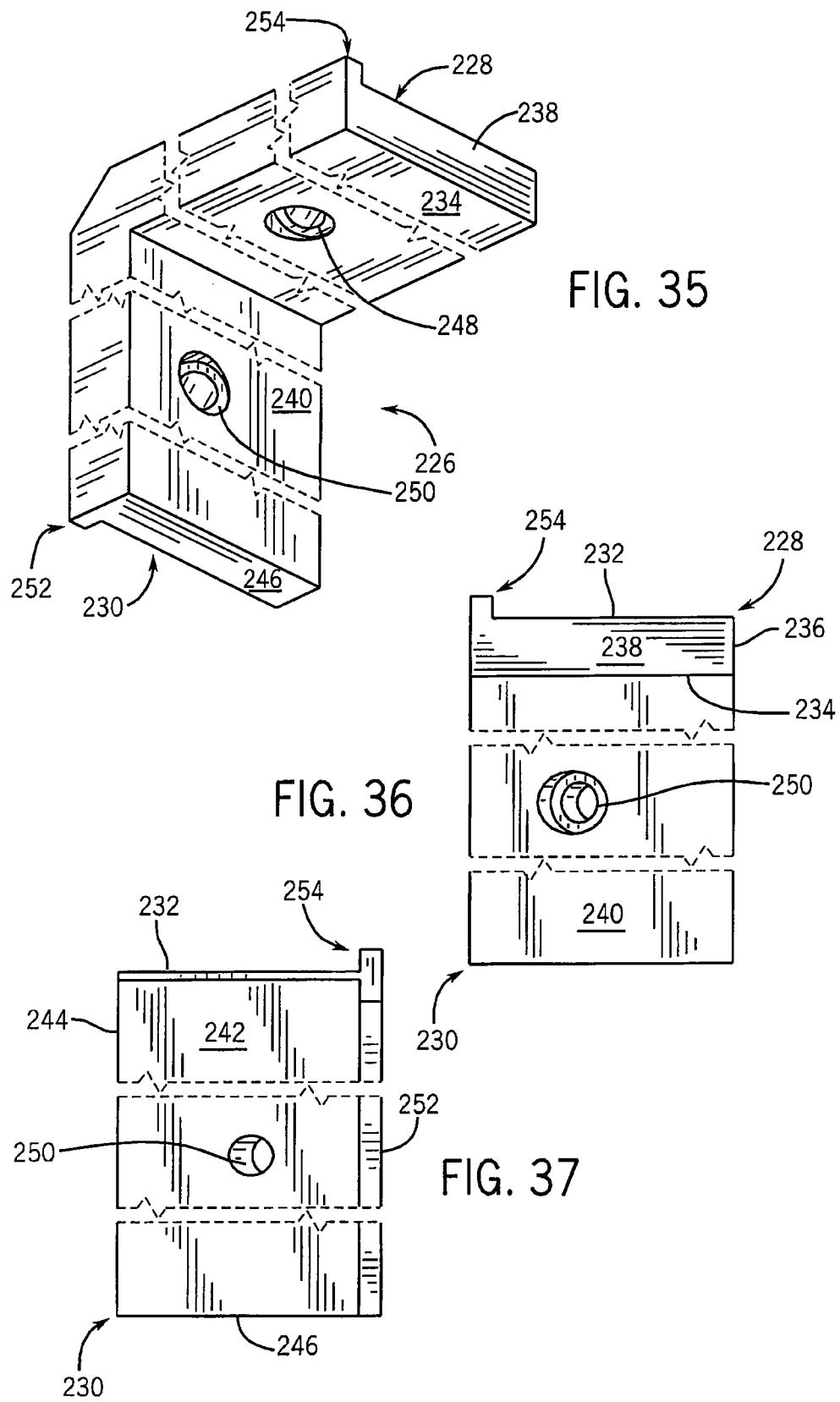

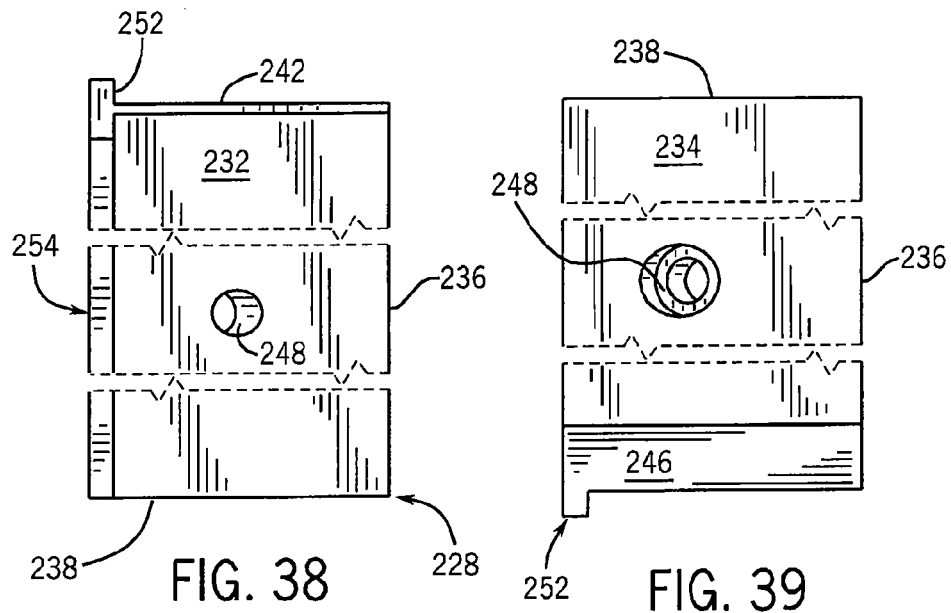
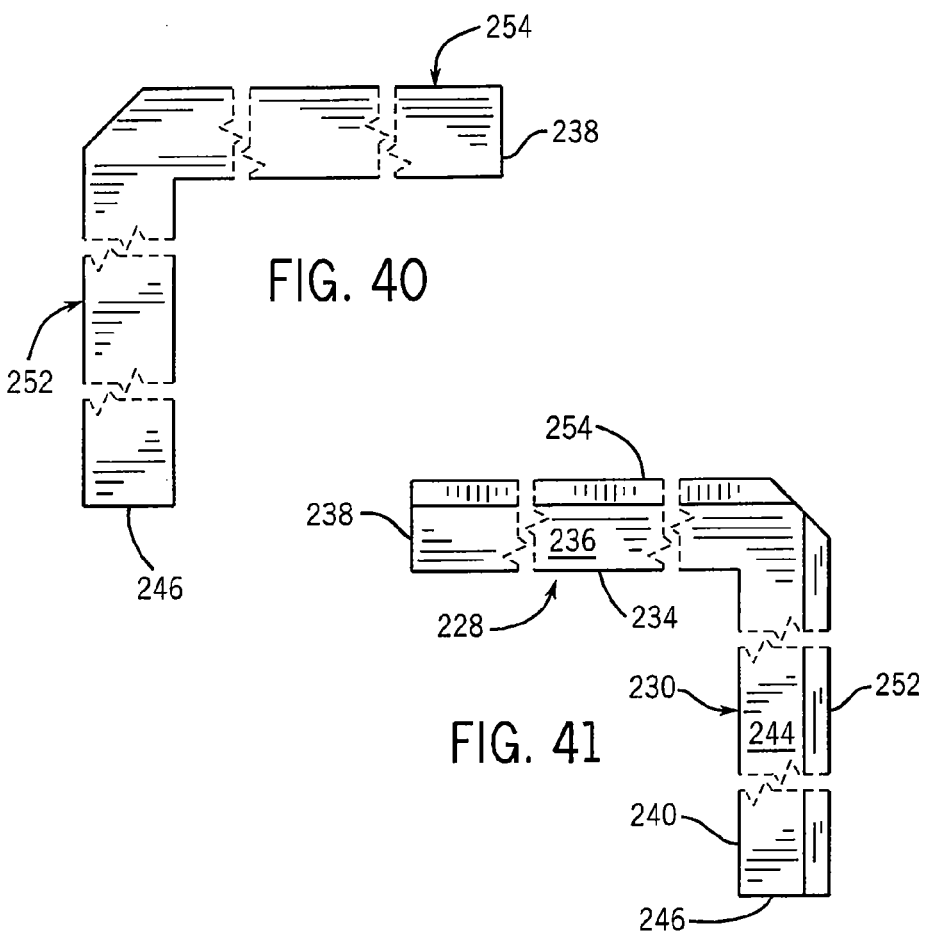

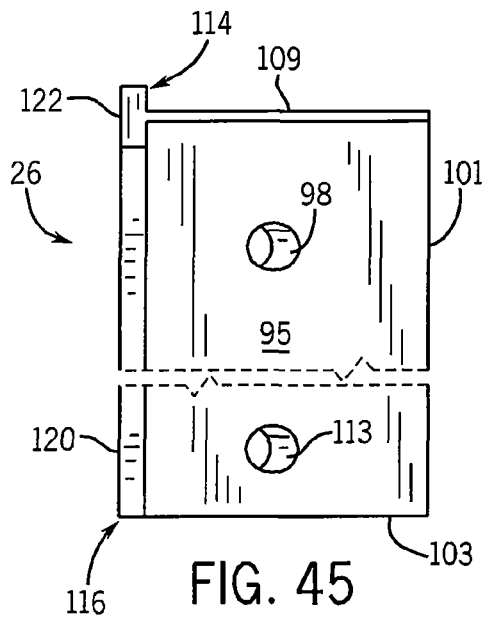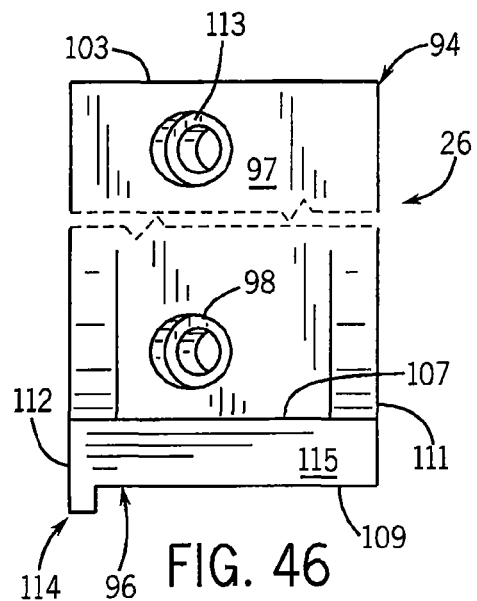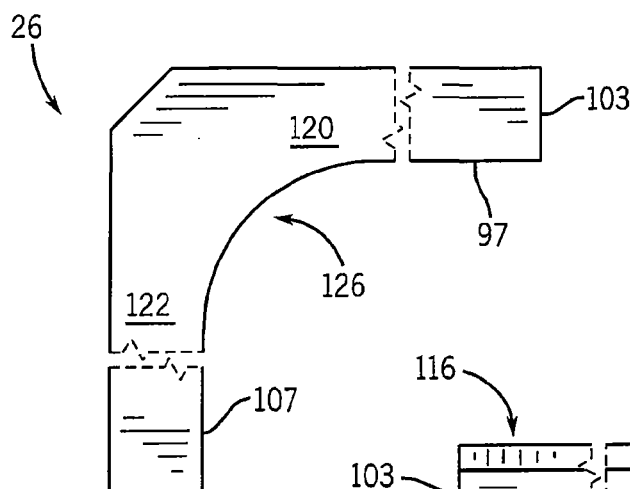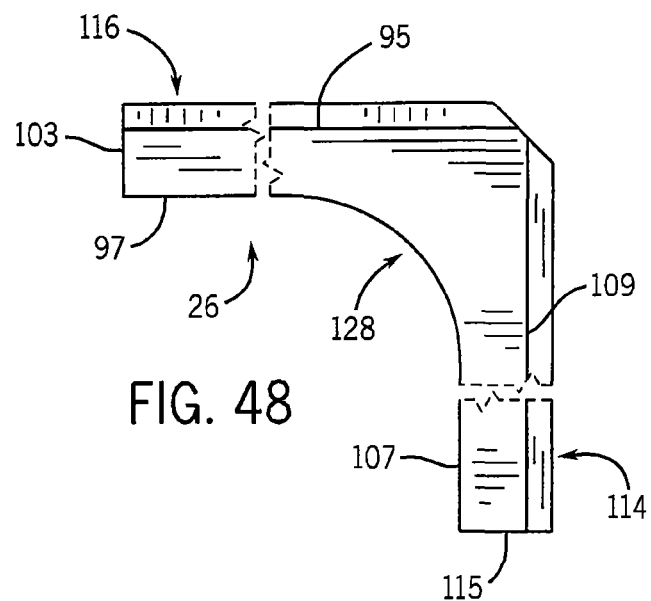
FIG. 45
FIG. 46
FIG. 47
FIG. 48

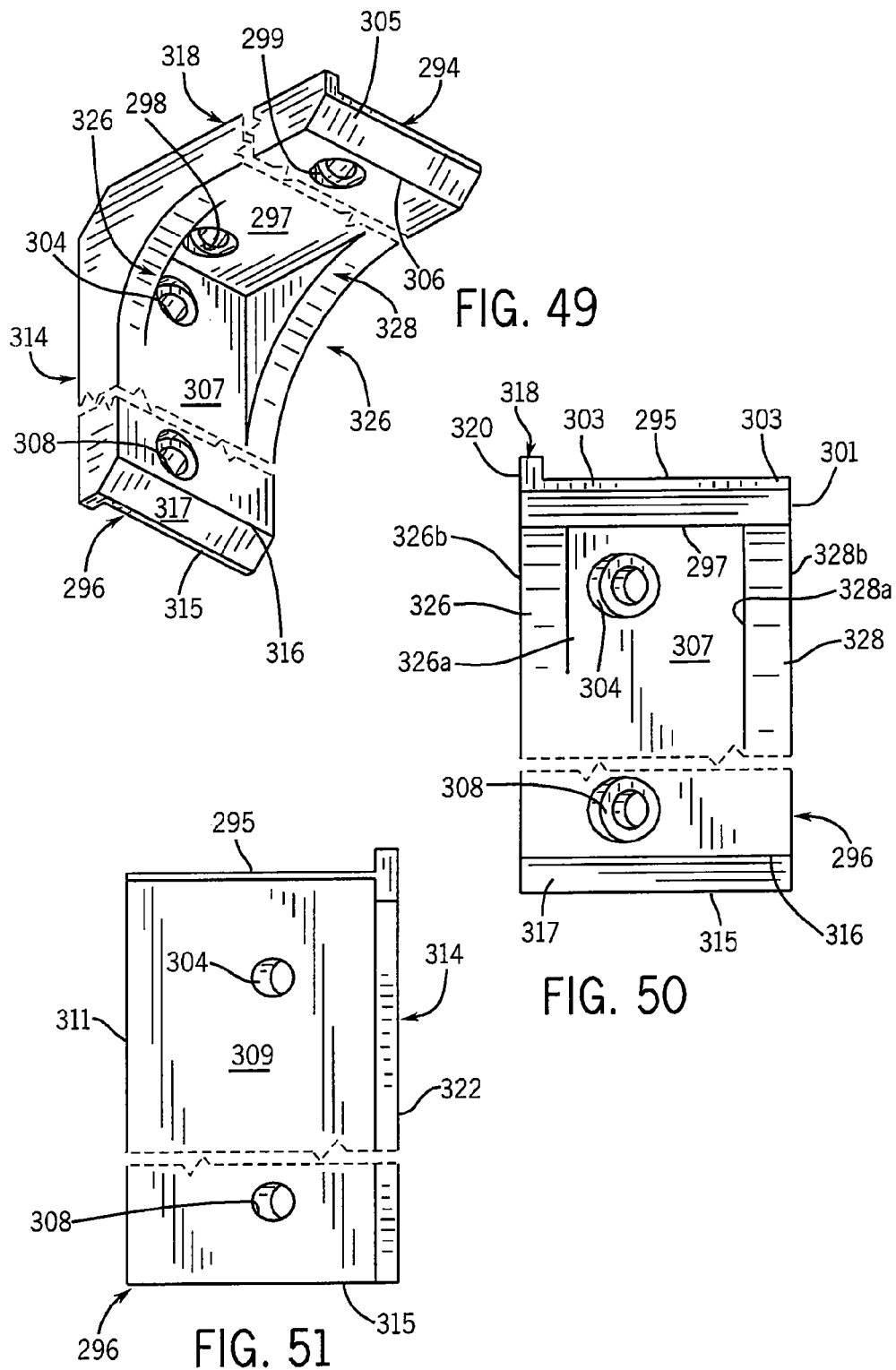

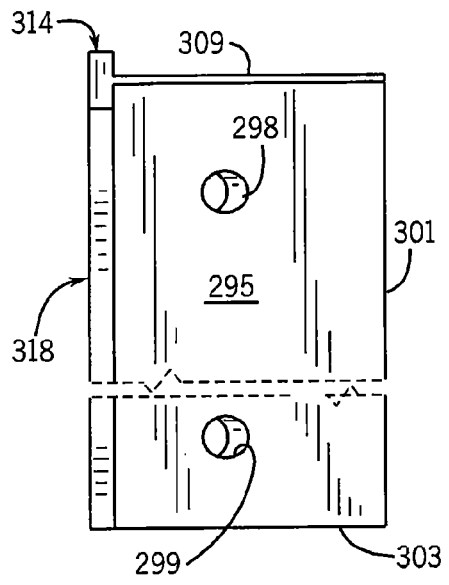
FIG. 52
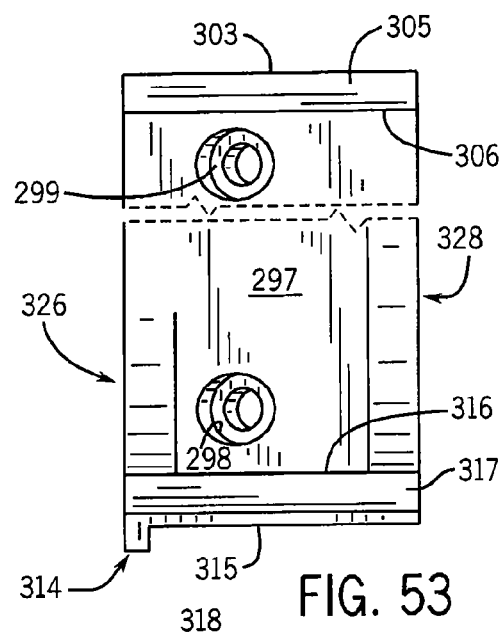
FIG. 53
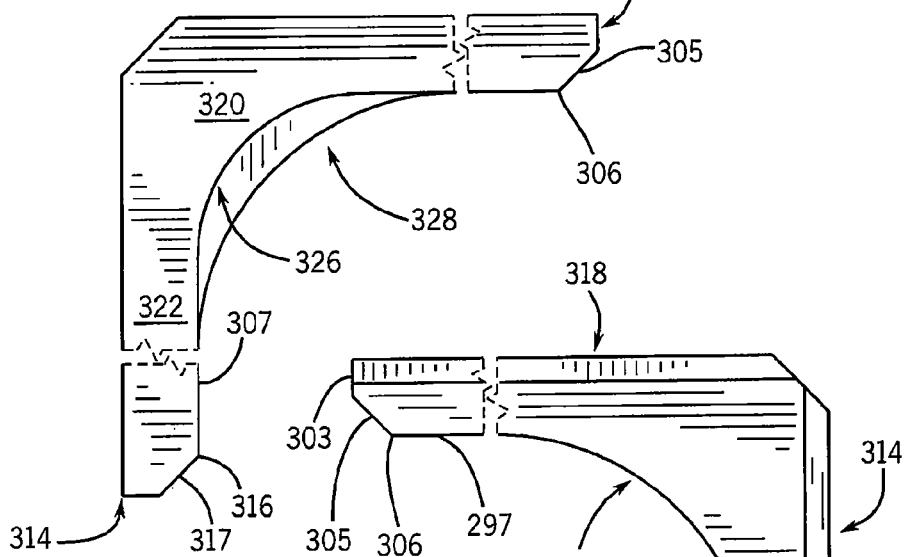
FIG. 54
FIG. 55
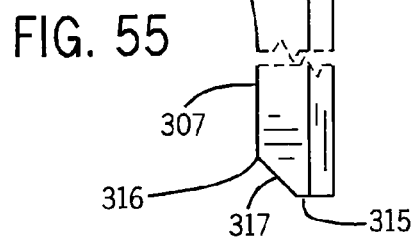

CORNER ASSEMBLY

CROSS-REFERENCE TO RELATED APPLICATIONS

This application is a continuation of application Ser. No. 13/086,644 filed Ap. 14, 2011, which claims priority from U.S. Provisional Patent Application Ser. No. 61/327,925 filed on Apr. 26, 2010, the entirety of which is expressly incorporated by reference herein.

FIELD OF THE INVENTION

This invention relates generally to structural frame assemblies for automation equipment and the like, and in particular, to a corner piece for mechanically interlocking first and second frame members in such a matter as to prevent rotation of the frame members and the corner piece during use.

BACKGROUND AND SUMMARY OF THE INVENTION

As is known, structural frames are used in the construction of a wide variety of products, including everything from automation equipment and furniture to buildings and the like. Structural frames typically incorporate horizontal and vertical frame members tied together by corner pieces, joints or bonding. Coverings, such as panels, may be secured to the frame members to isolate the interior of the structural frames and/or to provide an aesthetically pleasing appearance. In addition, various components may be interconnected to the structural frame to allow the structural frame to be used for its intended purpose. By way of example, hinges may be interconnected to the structural frame to facilitate the mounting of a door thereto. Alternatively, sliders may be interconnected to the sides of a structural frame so as to allow the structural frame to function as a drawer. It can be appreciated that other types of components may be interconnected to the structural frame to facilitate the intended purpose thereof.

Typically, the components of a structural frame are held together by means of friction. For examples, nut and bolt combinations are often used to secure horizontal and vertical frame members together. However, the nut and bolt combinations holding the structural frames together often come loose over time when subjected to vibration and/or the environment. As the nut and bolt combinations loosen, the integrity of the structural frame may be compromised. Further, as the nut and bolt combinations loosen, the frame members and the components therefore rotate with respect to one another, thereby compromising the alignment of the structural frame.

Therefore, it is a primary object and feature of the present invention to provide a corner piece for mechanically interlocking first and second frame members in such a matter as to prevent rotation of the frame members and the corner piece during use.

It is a further object and feature of the present invention to provide a corner piece for mechanically interlocking and self-aligning first and second frame members.

It is a still further object and feature of the present invention to provide a corner piece for mechanically interlocking first and second frame members that is simple to utilize.

In accordance with the present invention, a corner piece is provided for interconnecting frame members. The corner piece includes a first plate member defining an inner face, an opposite outer face, a first side face, an opposite second side face, and an end face. The first plate member including a bolt-receiving bore therethrough. A second plate member defines an inner face contiguous with the inner face of the first plate member, an outer face, a first side face, an opposite second side face, and an end face. The second plate member includes a bolt-receiving bore extending between the inner face and the outer face thereof along a first axis generally parallel to the inner face of the first plate member.

The bolt-receiving bore through the first plate member extends between the inner face and the outer face of the first plate member along a second axis generally parallel to the inner face of the second plate member. It is contemplated for the bolt-receiving bore through the first plate member to be a first bolt-receiving bore and for the first plate member to include a second bolt-receiving bore therethrough. The second bolt-receiving bore through the first plate member extends between the inner face and the lower face of the first plate member along a third axis generally parallel to the inner face of the second plate member. Likewise, the bolt-receiving bore through the second plate member may be is a first bolt-receiving bore and the second plate member may include a second bolt-receiving bore between the inner face and the outer face thereof along a second axis generally parallel to the inner face of the first plate member.

A gusset may interconnect the inner face of the second plate member and the inner face of the first plate member. In addition, the outer face of the second plate member may be contiguous with the outer face of the first plate member and the first side face of the second plate member may be contiguous with the first side face of the first plate member. A first lip may project outwardly from the outer face of the first plate member and a second lip may project from the outer face of the second plate member.

In accordance with a further aspect of the present invention, a corner piece is provided for interconnecting frame members. The corner piece includes a first plate member defining an inner face and an opposite outer face. The first plate member includes a bolt-receiving bore extending between the inner face and the outer face of the first plate member along a first axis. A second plate member is operatively connected to the first plate member and defines an inner face and an outer face. The second plate member includes a bolt-receiving bore extending between the inner face and the outer face thereof along a second axis generally parallel to the inner face of the first plate member. The first axis is generally parallel to the inner face of the second plate member.

It is contemplated for the bolt-receiving bore through the first plate member to be a first bolt-receiving bore and for the first plate member to include a second bolt-receiving bore therethrough. The second bolt-receiving bore through the first plate member extends between the inner face and the lower face of the first plate member along a third axis generally parallel to the inner face of the second plate member. Likewise, the bolt-receiving bore through the second plate member may be a first bolt-receiving bore and the second plate member may includes a second bolt-receiving bore between the inner face and the outer face thereof along a fourth axis generally parallel to the inner face of the first plate member.

A gusset interconnects the inner face of the second plate member and the inner face of the first plate member. The outer face of the second plate member may be contiguous with the outer face of the first plate member. A first lip may project outwardly from the outer face of the first plate member and a second lip may project from the outer face of the second plate member.

In accordance with a still further aspect of the present invention, a corner piece is provided for interconnecting frame members. The corner piece includes a first plate member defining an inner face and an opposite outer face. The first plate member has a first bolt-receiving bore extending between the inner face and the outer face of the first plate member along a first axis and a second bolt-receiving bore extending between the inner face and the outer face of the first plate member along a second axis. A second plate member is operatively connected to the first plate member and defines an inner face and an outer face. The second plate member includes a first bolt-receiving bore extending between the inner face and the outer face thereof along a third axis generally parallel to the inner face of the first plate member and a second bolt-receiving bore extending between the inner face and the outer face thereof along a fourth axis generally parallel to the inner face of the first plate member. A gusset interconnects the inner face of the second plate member and the inner face of the first plate member. The first and second axes are generally parallel to the inner face of the second plate member.

It is contemplated for the inner face of the second plate member to be contiguous with the inner face of the first plate member and the outer face of the second plate member to be contiguous with the outer face of the first plate member. A first lip may project outwardly from the outer face of the first plate member and a second lip may project from the outer face of the second plate member.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 11 is an enlarged isometric view of the assembled frame taken along line 11-11 of FIG. 2;

FIG. 11A is a side elevational view of a nut in accordance with the present invention;

FIG. 11B is an isometric view of a first side of the nut of FIG. 11A;

FIG. 11C is an isometric view of a second side of the nut of FIG. 11A;

FIG. 14 is a cross sectional view of the first and second interconnected frame members taken along line 14-14 of FIG. 12;

FIG. 15 is a cross sectional view of the first and second interconnected frame members taken along line 15-15 of FIG. 12;

FIG. 27 is an isometric view of a further embodiment of a corner piece in accordance with the present invention;

FIG. 28 is a front elevational view of the corner piece of FIG. 27;

FIG. 29 is a rear elevational view of the corner piece of FIG. 27;

FIG. 30 is a cross-sectional view of the corner piece of the present invention take along line 30-30 of FIG. 28;

FIG. 35 is an isometric view of an alternate embodiment of a corner piece in accordance with the present invention;

FIG. 36 is a front elevational view of the corner piece of FIG. 35;

FIG. 37 is a rear elevational view of the corner piece of FIG. 35;

FIG. 38 is a top plan view of the corner piece of FIG. 35;

FIG. 39 is bottom plan view of the corner piece of FIG. 35.

FIG. 40 is a side elevational view of a first side of the corner piece of FIG. 35;

FIG. 41 is a side elevational view of a second side of the corner piece of FIG. 35;

FIG. 45 is a top plan view of the corner piece of FIG. 42;

FIG. 46 is bottom plan view of the corner piece of FIG. 42;

FIG. 47 is a side elevational view of a first side of the corner piece of FIG. 42;

FIG. 48 is a side elevational view of a second side of the corner piece of FIG. 42;

FIG. 49 is an isometric view of a still further embodiment of a corner piece in accordance with the present invention;

FIG. 50 is a front elevational view of the corner piece of FIG. 49;

FIG. 51 is a rear elevational view of the corner piece of FIG. 49;

FIG. 52 is a top plan view of the corner piece of FIG. 49;

FIG. 53 is bottom plan view of the corner piece of FIG. 49;

FIG. 54 is a side elevational view of a first side of the corner piece of FIG. 49;

FIG. 55 is a side elevational view of a second side of the corner piece of FIG. 49;

DETAILED DESCRIPTION OF THE DRAWINGS

Figure 1:
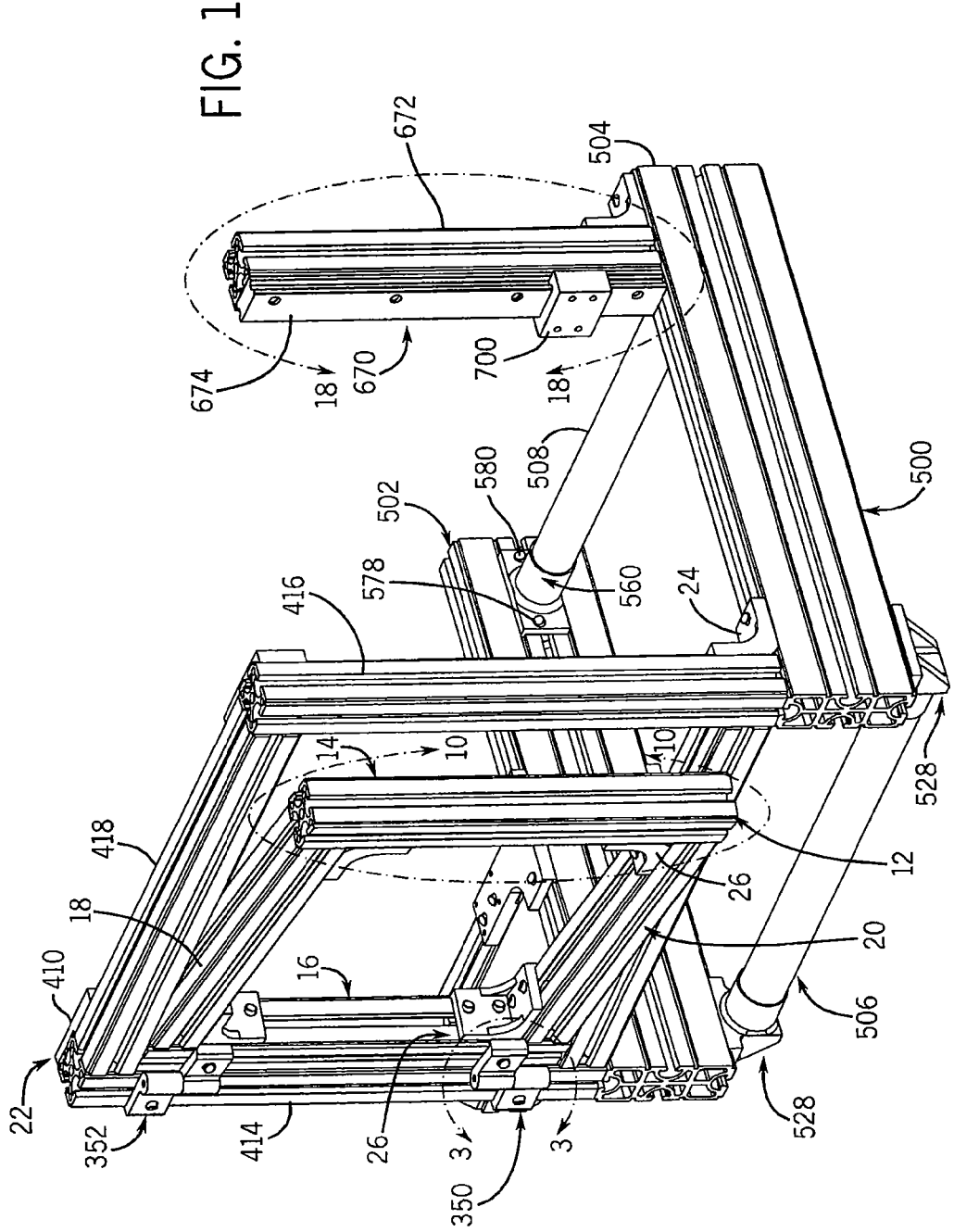
FIG. 1 is an isometric view of a first side of an assembled frame incorporating frame members and components therefore in accordance with the present invention.
Figure 2:
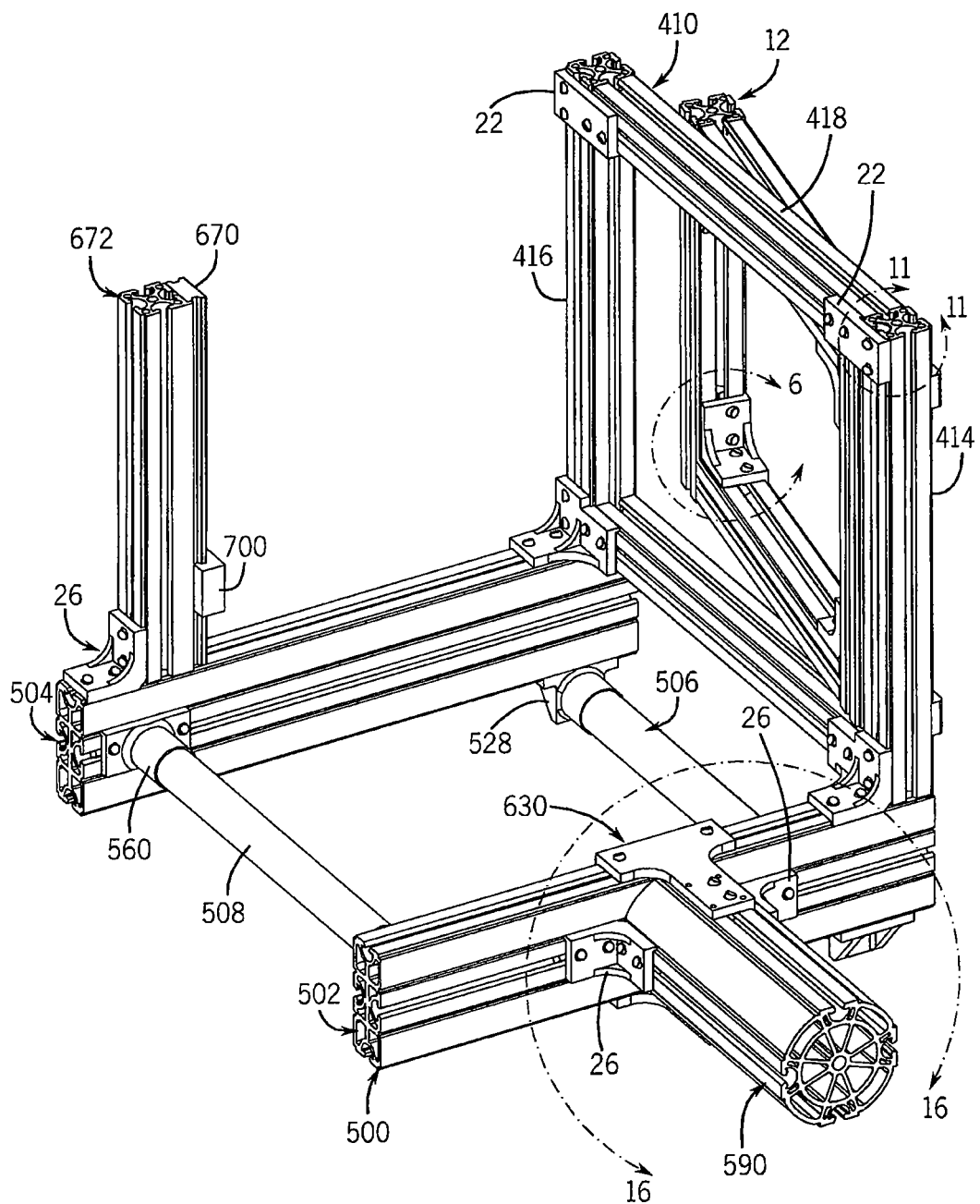
FIG. 2 is an isometric view of a second side of the assembled frame of FIG. 1 incorporating frame members and components therefore in accordance with the present invention.
Figure 3:
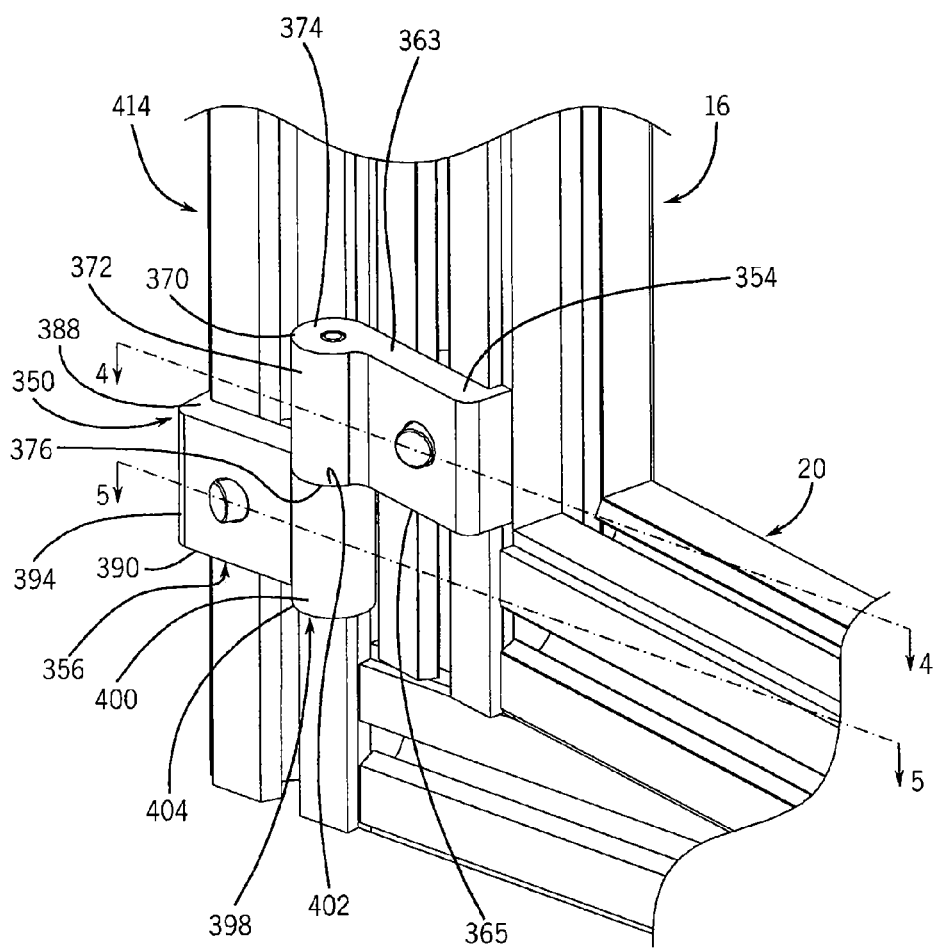
FIG. 3 is an enlarged isometric view of the assembled frame taken along line 3-3 of FIG. 1.
Figure 4:
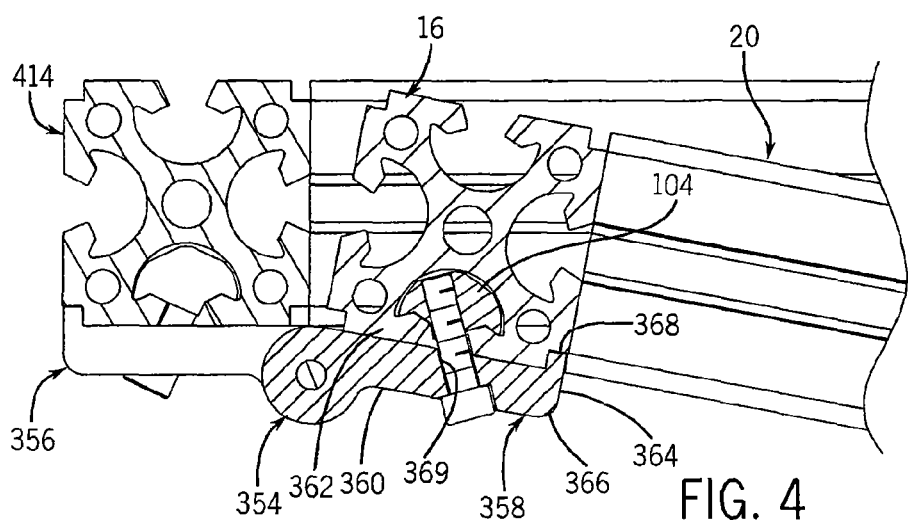
FIG. 4 is a cross sectional view of the assembled frame taken along line 4-4 of FIG. 3.
Figure 5:
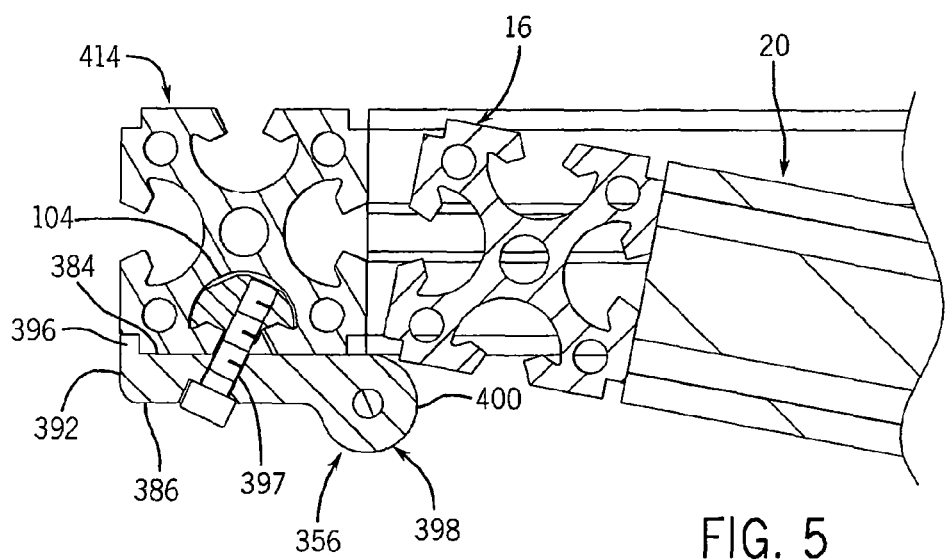
FIG. 5 is a cross sectional view of the assembled frame taken along line 5-5 of FIG. 3.

Referring to FIG. 1, a frame assembly constructed from components in accordance with the present invention is generally designated by the numeral 10. As hereinafter described, the components of the present invention may be used to construct frame assemblies of various configurations. As such, frame assembly 10 is merely exemplary of the type of frame assembly that may be constructed utilizing the components of the presents. Other configurations of frame assembly 10 are contemplated as being within the scope of the present invention.

Frame assembly 10 includes door frame 12 defined by first and second opposite, spaced apart longitudinally extending side frame members 14 and 16, respectively, upper frame member 18 and lower frame member 20. First side frame member 14 is rigidly interconnected to upper and lower frame members 18 and 20, respectively, by corner pieces 26, respectively. Similarly, second side frame member 16 is rigidly interconnected to upper and lower cross frame members 18 and 20, respectively, by corner pieces 26, respectively. Corner piece 26 is hereinafter referred to as left corner pieces while corner piece 24 are hereinafter referred to as right corner piece. The terms "right" and "left" refer to the location of a tenon or lip on the underside of each corner piece. It can be appreciated that left corner piece 26 is essentially a mirror image of right corner pieces 24. Corner pieces 24 and 26 are used to rigidly interconnect frame members, such as first and second side frame members 14 and 16, respectively, to cross frame members such as upper cross frame member 18 and lower frame member 20, as hereinafter described.

Figures 9, 10:
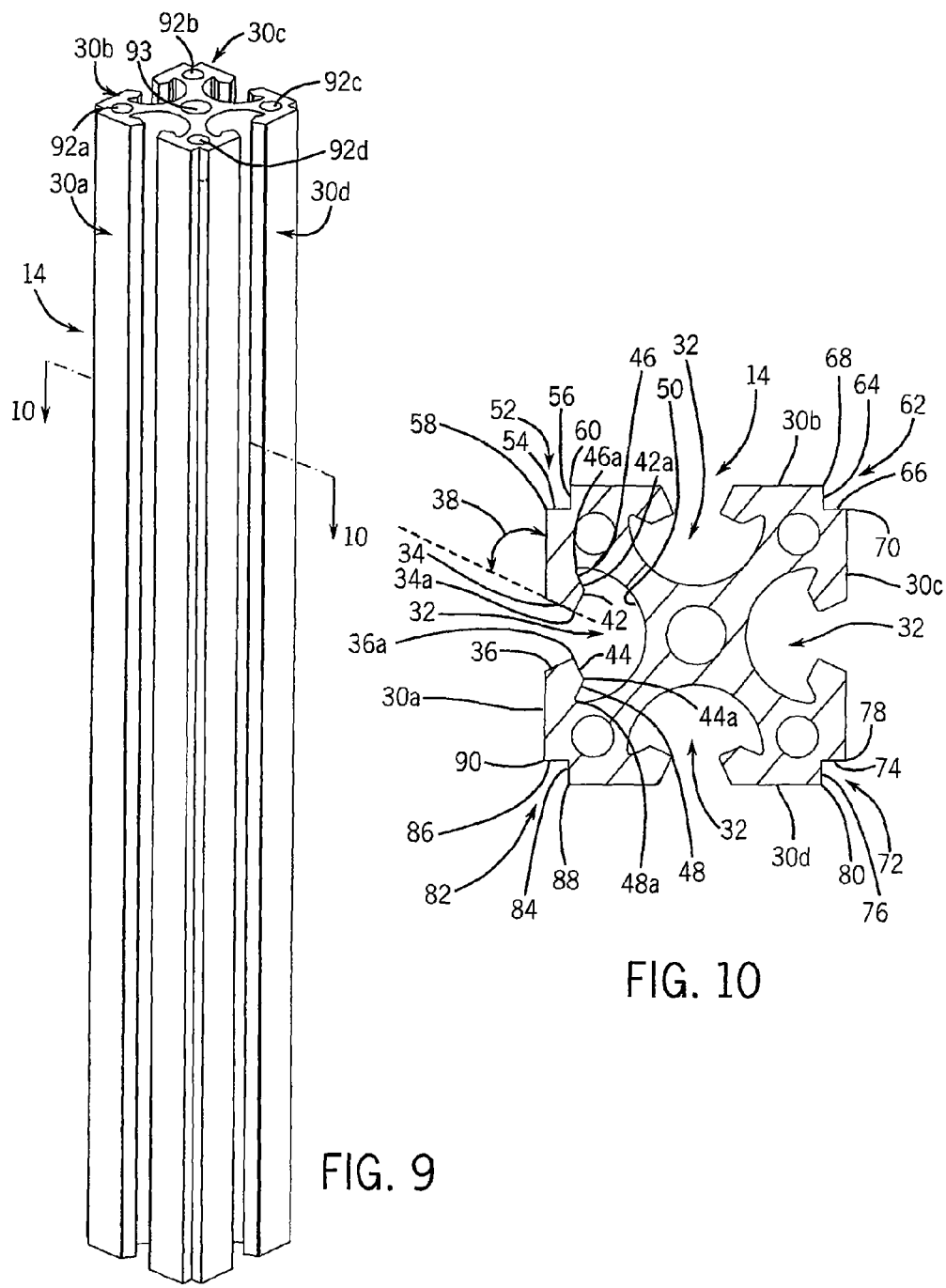
FIG. 9 is an isometric view of a frame member in accordance with the present invention.
FIG. 10 is a cross sectional view of the frame member taken along line 10-10 of FIG. 9.
Figure 12:
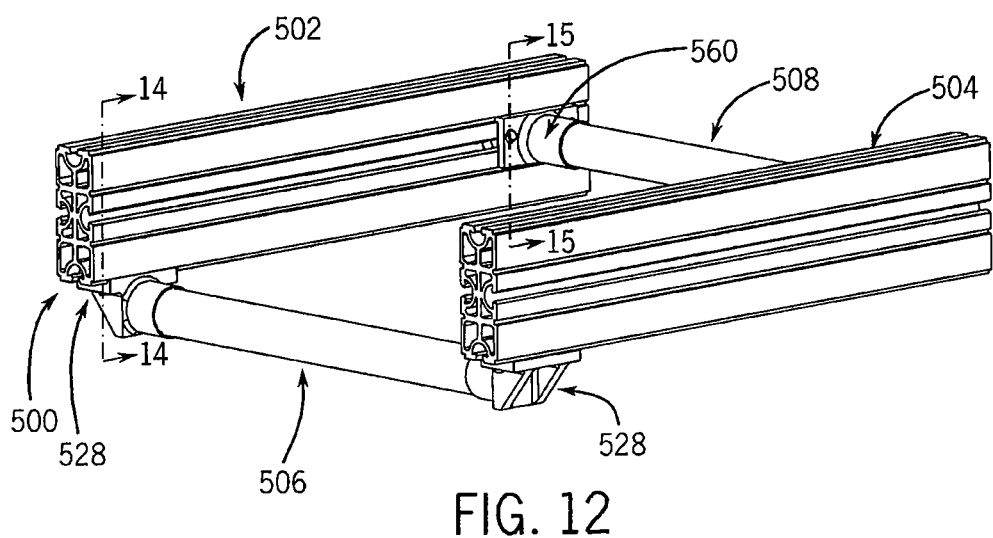
FIG. 12 is an isometric view of a portion of the assembled frame of FIG. 1 showing first and second interconnected frame members in accordance with the present invention.
Figure 13:
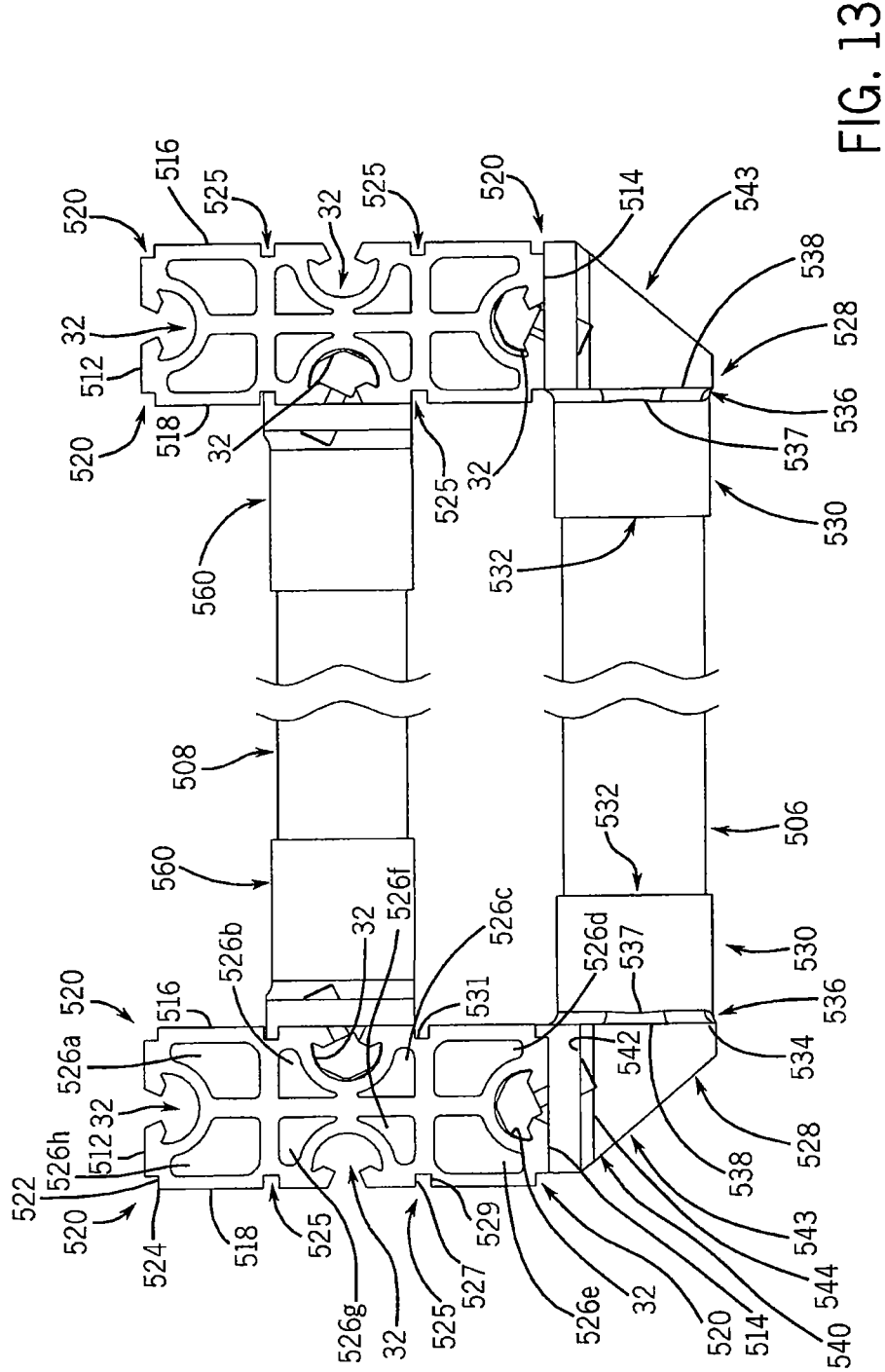
FIG. 13 is an end view of the first and second interconnected frame members of FIG. 12.

In the depicted embodiment, first and second side frame members 14 and 16, respectively, upper frame member 18 and lower frame member 20 are identical in structure, and as such, the description hereinafter of first side frame member 14 is understood to describe second side frame member 16, upper frame member 18 and lower frame member 20, as if fully described herein. Referring to FIGS. 1 and 9-10, first side frame member 14 has a generally square configuration and extends along a longitudinal axis. First side frame member 14 is defined by four faces 30a-30d. Each face 30a-30d is identical in structure, and as such, the description hereinafter of face 30a is understood to describe faces 30b-30d, as if fully described herein. Each face 30a of first side frame member 14 is generally flat and includes slot 32 therein that extends along the entire length thereof. Slot 32 is defined by first and second sidewalls 34 and 36, respectively, extending from face 30a at an angle 38 thereto. It is contemplated that angle 38 fall within the range of 1° and 89°, but is preferably between about 30° to about 80° and is most preferably about 65°. Slot 32 is further defined by first and second outer abutment walls 42 and 44, respectively, which diverge from corresponding terminal edges 34a and 36a, respectively, of first and second sidewalls 34 and 36, respectively. First abutment wall 42 is perpendicular to first sidewall 34 and second abutment wall 44 is perpendicular to second sidewall 36. First and second inner abutment walls 46 and 48, respectively, diverge from each other and extend from inner edges 42a and 44a, respectively of first and second outer abutment walls 42 and 44, respectively. Concave terminal wall 50 extends between terminal edges 46a and 48a, respectively, of first and second inner abutment walls 46 and 48, respectively. For reasons hereinafter described, first outer abutment wall 42 lies in a plane generally parallel to the plane of second inner abutment wall 48. Similarly, second outer abutment wall 44 lies in a plane generally parallel to the plane of first inner abutment wall 46. Slot 32 is configured to conform to the shape of nuts 104 captured therein, as hereinafter described.

Referring to FIGS. 19-23, an alternate embodiment of frame member is generally designated by the reference numeral 51. Frame member 51 has a generally square configuration and extends along a longitudinal axis. More specifically, frame member 51 is defined by four, generally flat faces 53a-53d, as well as, first and second opposite ends 55 and 57, respectively. It is contemplated for frame member 51 to be fabricated in any user desired length. Faces 53b and 53d are generally flat and parallel to each other. Face 53c interconnects faces 53b and 53d at edges 59 and 61, respectively. Similarly, face 53a interconnects faces 53b and 53d at edges 63 and 65, respectively, and includes slot 32 (heretofore described) therein that extends along the entire length thereof. The ends of slot 32 open to corresponding ends 55 and 57 of frame member 51. As previously described, slot 32 is configured to conform to the shape of nuts 104 captured therein.

Referring back to FIGS. 9-10, first side frame member 14 includes first ledge 52 formed at the junction of first face 30a and second face 30b and extending along the length thereof. First ledge 52 is defined by first and second sidewalls 54 and 56, respectively, that are perpendicular to and intersect each other. First sidewall 54 intersects first face 30a at edge 58 and second sidewall 56 intersects second face 30b at edge 60. Second ledge 62 is formed at the junction of second face 30b and third face 30c and extends along the length of first side frame member 14. Second ledge 62 is defined by first and second sidewalls 64 and 66, respectively, that are perpendicular to and intersect each other. First sidewall 64 intersects second face 30b at edge 68 and second sidewall 66 intersects third face 30c at edge 70. Third ledge 72 is formed at the junction of third face 30c and fourth face 30d and extends along the length of first side frame member 14. Third ledge 72 is defined by first and second sidewalls 74 and 76, respectively, that are perpendicular to and intersect each other. First sidewall 74 intersects third face 30c at edge 78 and second sidewall 76 intersects fourth face 30d at edge 80. Fourth ledge 82 is formed at the junction of fourth face 30d and first face 30a and extends along the length of first side frame member 14. Fourth ledge 82 is defined by first and second sidewalls 84 and 86, respectively, that are perpendicular to and intersect each other. First sidewall 84 intersects fourth face 30d at edge 88 and second sidewall 86 intersects first face 30a at edge 90. First side frame member 14 may include a plurality of passageways 92a-92d extending through the entire length thereof. In addition, central passageway 93 extends through the entire length of first side frame member 14 along the central longitudinal axis thereof. It is noted that first, second, third and fourth ledges 52, 62, 72 and 82, respectively, are optional in certain circumstances, as hereinafter described.

Referring to FIGS. 1 and 42-48, left corner pieces 26 interconnect first side frame member 14 to upper and lower cross frame members 18 and 20, respectively. Each left corner piece 26 includes an L-shaped body defined by horizontal plate member 94 and an upright or vertical plate member 96. Horizontal plate member 94 defines a substantially flat upper face 95, a substantially flat opposite inner face 97, an inside face 101, and an end face 1-3. In the depicted embodiment, each of these faces is substantially planar in shape. Upright or vertical plate member 96 also defines a substantially flat inner face 107 contiguous with the inner face 97 of horizontal plate member 94, a substantially flat outer face 109 contiguous with the upper face 95 of horizontal plate member 94, an inside face 111 contiguous with the inside face 101 of horizontal plate member 94, and a bottom face 115. Horizontal plate member 94 has a pair of adjacent, upwardly extending bolt receiving bores 98 and 113 formed therethrough that extend between the inner face 97 and the upper face 95 thereof. Each bore 98 and 113 defines an axis generally parallel to the plane in which vertical plate member 96 lies and is disposed at an acute angle with respect to the lower face of horizontal plate member 94. It is preferred that the acute angle fall in the range of 1° and 89°, but preferably between about 30° and about 80°, and is most preferably about 65°. Bolts (not shown) extend through corresponding bores 98 and 113, respectively, in horizontal plate member 94 into slot 32 in first face 30a of upper cross frame member 18. As hereinafter described, nuts 104 are provided within a terminal end of the slot 32 in first face 30a of upper cross frame member 18 and threaded onto the shafts of corresponding bolts so as to rigidly connect left corner piece 26 to upper cross frame member 18.

Upright or vertical plate member 96 of left corner piece 26 also includes a pair of adjacent, aligned outwardly extending bolt receiving bores 105 and 106 formed therethrough from its inner face 107 to its outer face 109 through which corresponding bolts (not shown) extend into slot 32 in first face 30a of first side frame member 14. Each bore 105 and 106 defines an axis generally parallel to the plane in which horizontal plate member 94 lies and is disposed at an acute angle with respect to the inner face 107 of vertical plate member 96. Again, this acute angle may be anywhere between 1° and 89°, but is preferably between about 30° and about 80°, and is most preferably about 65°. Nuts 104 are provided within a terminal end of the slot 32 in first face 30a of first side frame member 14 and threaded onto the shafts of corresponding bolts so as to rigidly connect left corner piece 26 to first side frame member 14.

Vertical plate member 96 has a lip 114 projecting outwardly therefrom. Lip 114 has a lower surface contiguous with the bottom face 115 of vertical plate member 96. Lip 114 is disposed substantially 90° with respect to the outer face 109 of vertical plate member 96 along the entire length thereof. Although lip 114 need not necessarily extend along the entire length across the outer face 109 of vertical plate member 96, but preferably does so to provide the maximum amount of clamping force against first ledge 52 in first side frame member 14. Similarly, horizontal plate member 94 has a lip 116 projecting outwardly therefrom. Lip 116 has an end surface contiguous with the end face 103 of horizontal plate member 94. Lip 116 is disposed substantially 90° with respect to the outer face 95 of horizontal plate member 94 along the entire length thereof. Although lip 116 need not necessarily extend along the entire length across the outer face 95 of vertical plate member 94, but preferably does so to provide the maximum amount of clamping force against first ledge 52 in upper side frame member 18. It is contemplated for outer face 120 of lip 116 to be generally contiguous with outer face 122 of lip 114.

Left corner piece 26 first includes first and second gussets 126 and 128, respectively, extending between the inner faces 97 and 107 of horizontal plate member 94 and vertical plate member 96. First and second gussets 126 and 128, respectively, include inner faces 126a and 128a directed toward each other and outer faces 126b and 128b. Outer face 126b of first gusset 126 is contiguous with outer face 120 of lip 116 and with outer face 122 of lip 114.

Referring to FIGS. 11A-11C, in order to interconnect left corner piece 26 to first side frame member 14 and to upper cross frame member 18, nuts 104 are provided. Each nut 104 is defined by first and second end faces 130 and 132, respectively. First and second end faces 130 and 132, respectively, are spaced by a generally convex surface 134. Surface 134 of nut 104 includes first arcuate portion 136 having an outer edge 136a and an inner edge 136b. First flat portion 140 extends from inner edge 136b of first arcuate portion 136 and terminates at edge 142 which is generally parallel to inner edge 136b. Second flat portion 144 of surface 134 extends from edge 142 terminates at edge 146 which is generally parallel to edge 142. Second arcuate portion 148 of surface 134 extends from edge 146 and terminates at terminal edge 148a.

Each nut 104 further includes engagement surface 160 extending from first end face 130 to second end face 132, and between outer edge 136a and edge 146. Engagement surface 160 is defined by first abutment wall 164 which extends from outer edge 136a and terminates at inner edge 166. Central abutment wall 168 extends from inner edge 166 and terminates at terminal edge 169. Central abutment wall 168 lies in a plane generally parallel to the plane in which second flat portion 144 of convex surface 134. Threaded apertures 170 extend between central abutment wall 168 and second flat portion 144 of convex surface 134 along corresponding axes generally perpendicular thereto, for reasons hereinafter described. The number and location of apertures extending between central abutment wall 168 and second flat portion 144 of convex surface 134 may vary without deviating from the scope of the present invention. Engagement surface 160 further includes alignment surface 176 which extends from terminal edge 169 of central abutment wall 168 and is generally perpendicular to central abutment wall 168. Alignment surface 176 terminates at inner edge 178. It is intend for alignment surface 176 to form a slidable interface with a selected one of first and second sidewalls 34 and 36, respectively, partially defining slot 32, for reasons hereinafter described. Second abutment wall 182 extends from inner edge 178 and terminates at terminal edge 184. Second abutment wall 182 lies in a plane generally parallel to the plane in which first flat portion 140 of convex surface 134 lies and to the plane in which central abutment wall 168 lies. Third abutment wall 186 extends between terminal edge 184 of second abutment wall 182 and terminal edge 148a of second arcuate portion 148 of surface 134. Third abutment wall 186 lies in a plane generally parallel to the plane in which second flat portion 144 of convex surface 134 lies and the plane in which central abutment wall 168 lies.

In order to interconnect left corner piece 26 to first side frame member 14 and to upper cross frame member 18, end 18a of upper cross frame member 18 is positioned against first face 30a of first side frame member 14. Left corner piece 26 is positioned such that upper face 95 of horizontal plate member 94 engages first face 30a of upper cross frame member 18 and such that outer face 109 of vertical plate member 96 engages first face 30a of first side frame member 14. Lip 116 is seated in fourth ledge 82 of upper cross frame member 18 and lip 114 is seated in first ledge 52 of first side frame member 14. Nut 104 is positioned in slot 32 in upper cross frame member 18 such that bolt receiving bores 98 and 113 are axially aligned with threaded apertures 170 therein. Bolts 190 are inserted into bolt receiving bores 98 through horizontal plate member 94 and threaded into corresponding threaded apertures 170 in nut 104. As bolts 190 are threaded into corresponding threaded apertures 170 in nut 104, central abutment wall 168 of nut 102 is drawn towards and engages abutment wall 42. Similarly, third abutment wall 186 of nut 104 is drawn towards and engages second inner abutment wall 48. In addition, first and second abutment walls 164 and 182, respectively, of nut 102 slidably engage second outer abutment wall 46 and first inner abutment wall 44, respectively. Likewise, nut 104 is positioned in slot 32 in first side frame member 14 such that bolt receiving bores 106 are axially aligned with threaded apertures 170 therein. Bolts 190 are inserted into bolt receiving bores 106 through vertical plate member 96 and threaded into corresponding threaded apertures 170 in nut 104. As bolts 190 are threaded into corresponding threaded apertures 170 in nut 104, central abutment wall 168 of nut 102 is drawn towards and engages abutment wall 42. Similarly, third abutment wall 186 of nut 104 is drawn towards and engages second inner abutment wall 48. In addition, first and second abutment walls 164 and 182, respectively, of nut 104 slidably engage second outer abutment wall 46 and first inner abutment wall 44, respectively. As described, left corner piece 26 locks first side frame member 14 and upper cross frame member 18 together in multiple planes, thereby preventing the pivoting of first side frame member 14 and upper cross frame member 18 with respect to each other.

Figure 6:
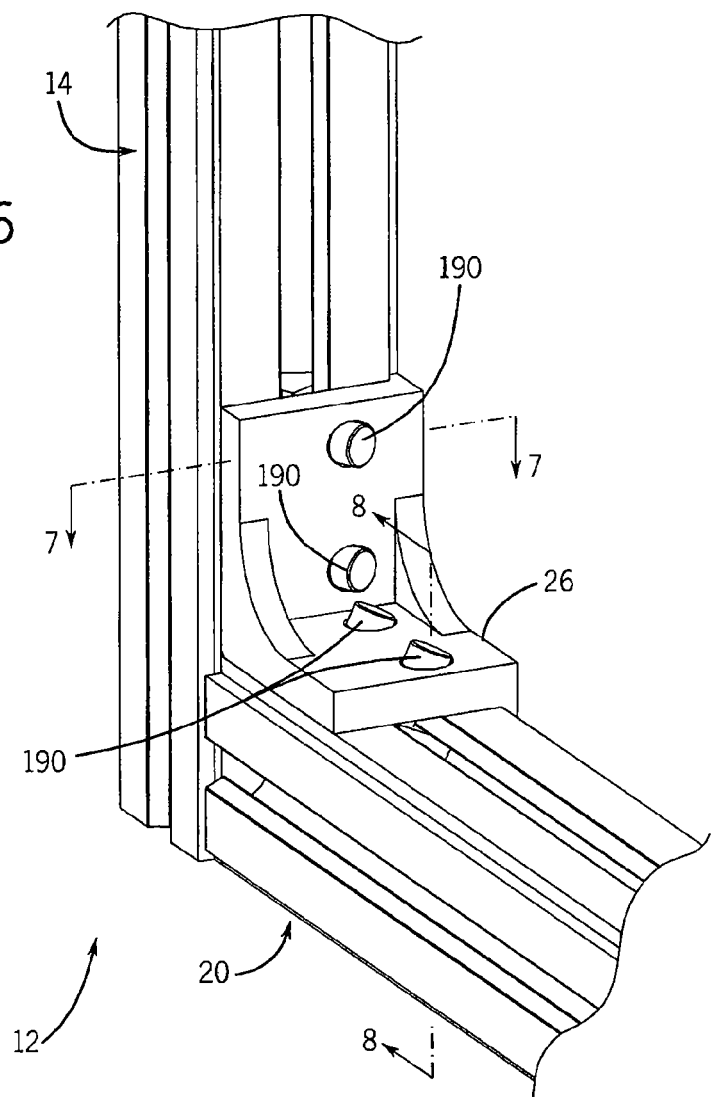
FIG. 6 is an enlarged isometric view of the assembled frame taken along line 6-6 of FIG. 2.
Figure 7:
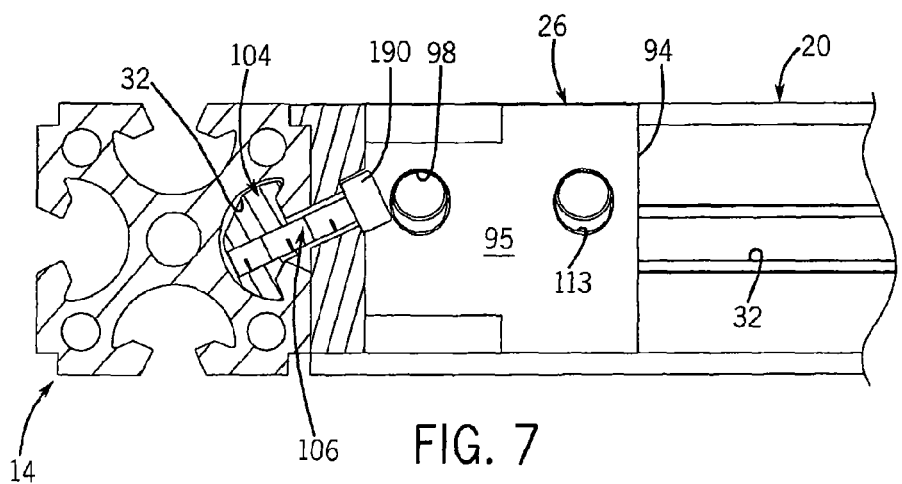
FIG. 7 is a cross sectional view of the assembled frame taken along line 7-7 of FIG. 6.
Figure 8:
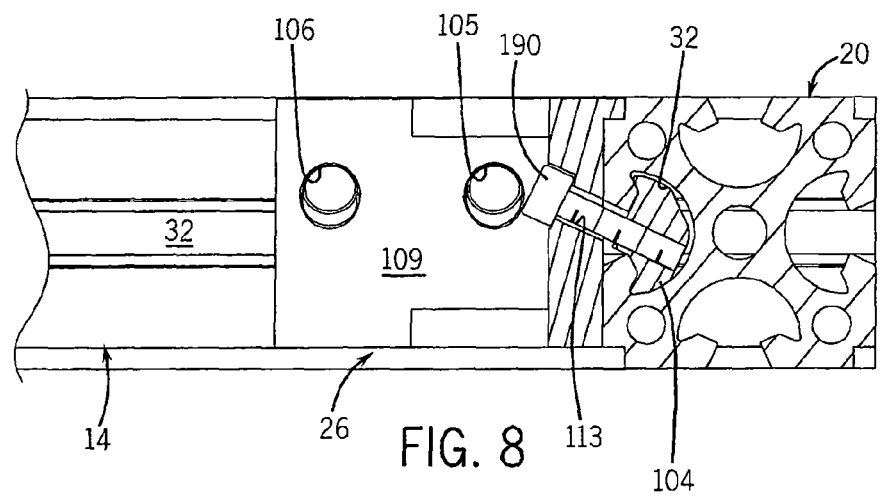
FIG. 8 is a cross sectional view of the assembled frame taken along line 8-8 of FIG. 6.

In the same manner, it can be appreciated that left corner pieces 26 may be used to interconnect first side frame member 14 to lower cross frame member 20, FIG. 6, and to connect second side frame member 16 to upper and lower cross frame members 18 and 20, respectively, thereby forming door frame 12. It is contemplated to provide various alternate embodiments of corner pieces that may be used to interconnect first and second frame members, such as first side frame member 14 and lower frame member 20, at a right angle to each other.

Figure 24:
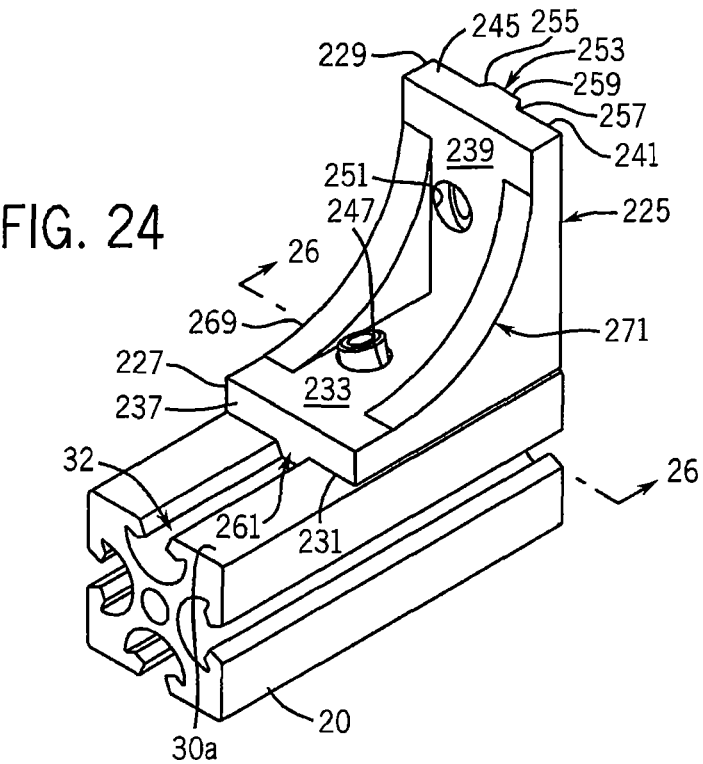
FIG. 24 is an isometric view of a corner piece in accordance with the present invention mounted on an alternate frame member.
Figure 25:
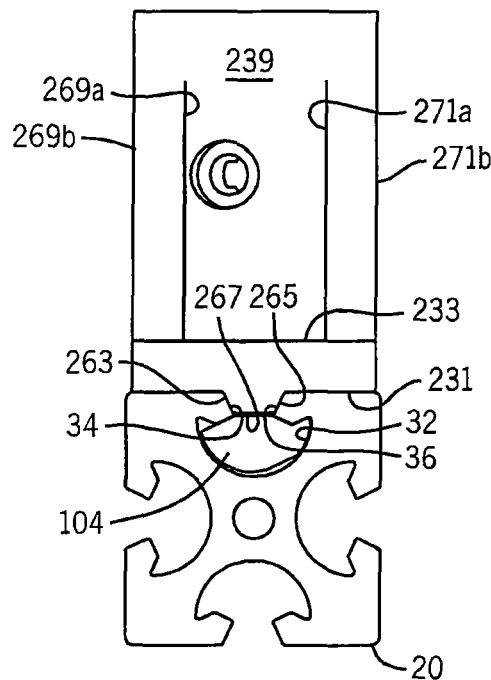
FIG. 25 is an end view of the corner piece and the frame member of FIG. 24.
Figure 26:
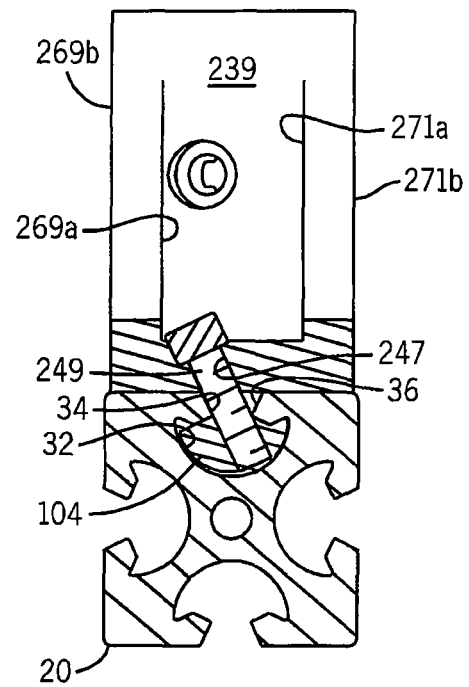
FIG. 26 is a cross sectional view of the corner piece and the frame member taken along line 26-26 of FIG. 24.
Figure 31:
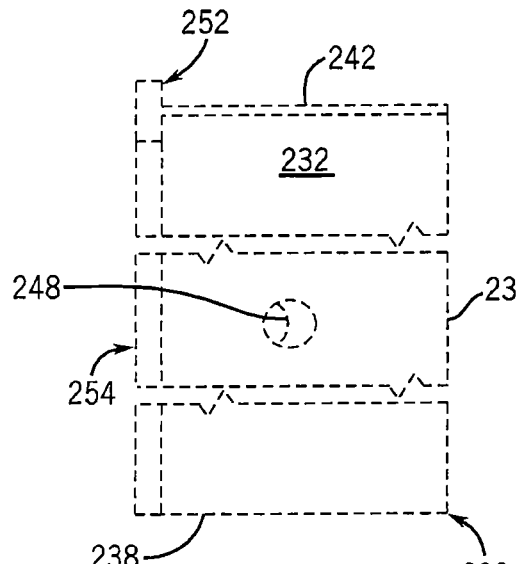
FIG. 31 is a top plan view of the corner piece of FIG. 27.
Figure 32:
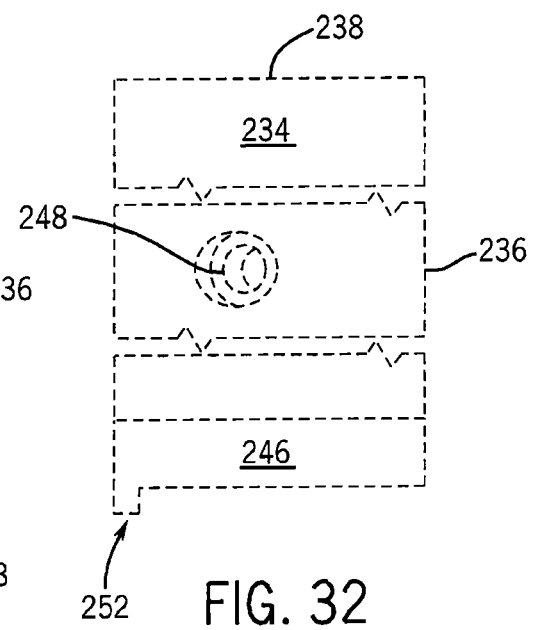
FIG. 32 is bottom plan view of the corner piece of FIG. 27.
Figure 33:
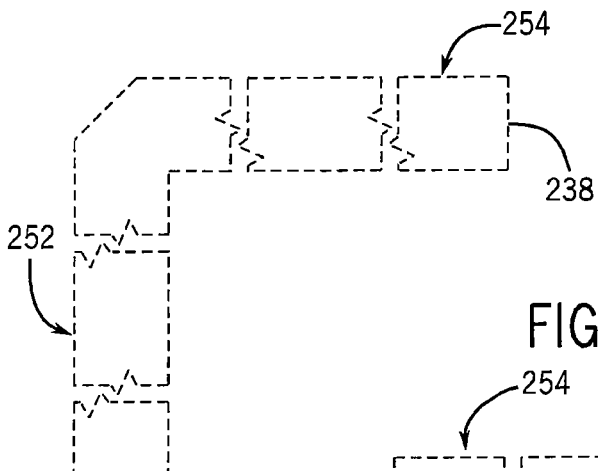
FIG. 33 is a side elevational view of a first side of the corner piece of FIG. 27.
Figure 34:
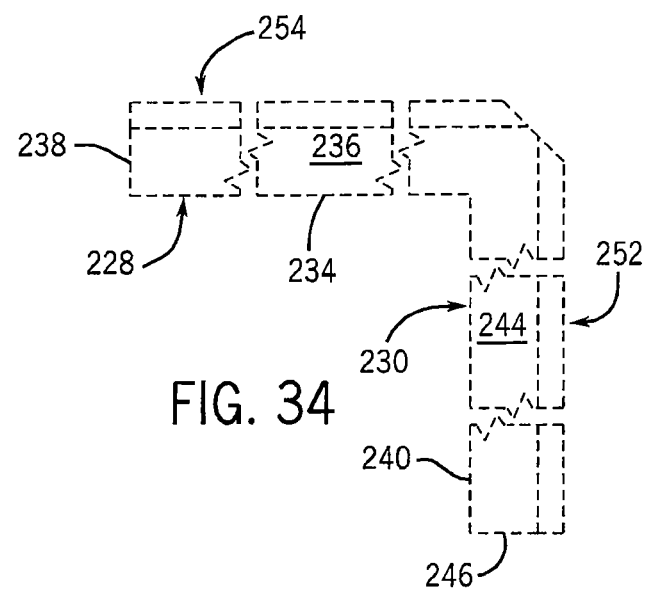
FIG. 34 is a side elevational view of a second side of the corner piece of FIG. 27.
Figure 42:
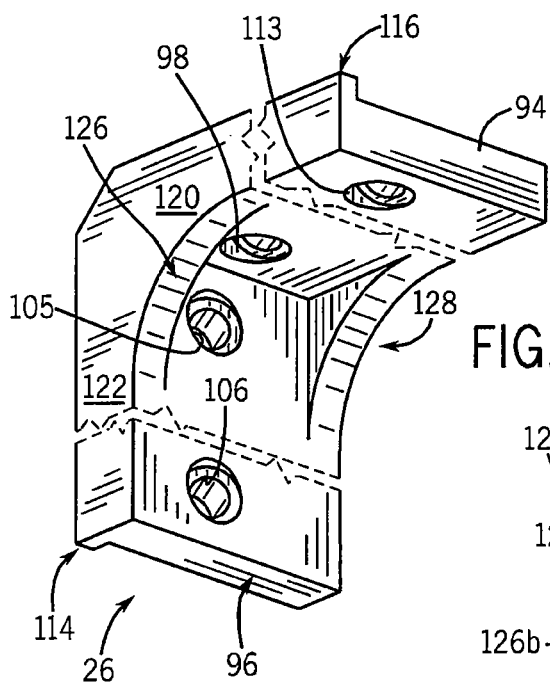
FIG. 42 is an isometric view of a still further embodiment of a corner piece in accordance with the present invention.
Figure 43:
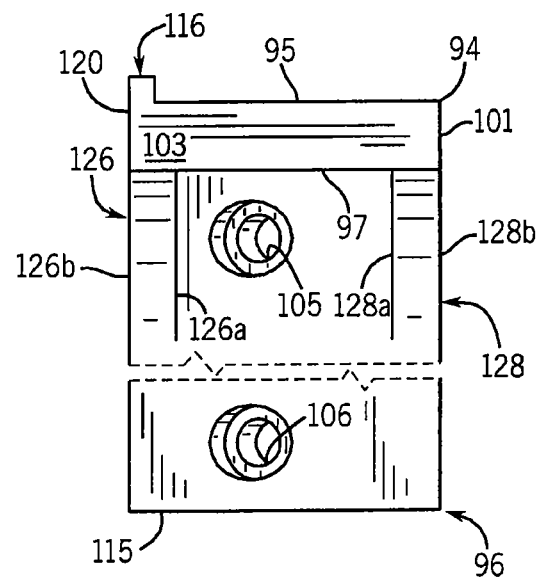
FIG. 43 is a front elevational view of the corner piece of FIG. 42.
Figure 44:
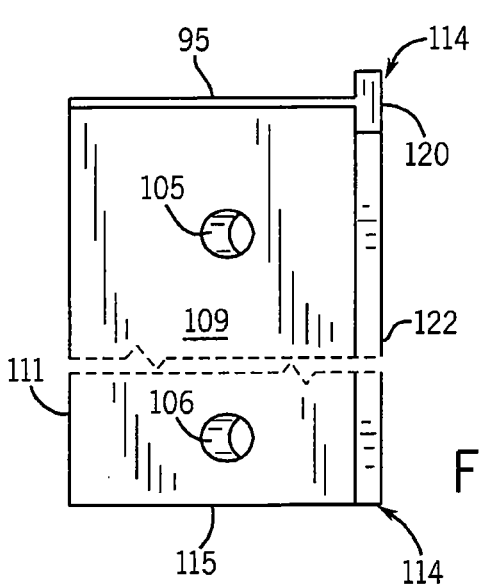
FIG. 44 is a rear elevational view of the corner piece of FIG. 42.

Referring to FIGS. 24-26, an alternate embodiment of a corner piece is generally designated by the reference number 225. Corner piece 225 includes an L-shaped body defined by horizontal plate member 227 and an upright or vertical plate member 229. Horizontal plate member 227 defines a substantially flat lower face 231, a substantially flat opposite inner face 233, and inside face, and an end face 237. In the depicted embodiment, each of these faces is substantially planar in shape. Upright or vertical plate member 229 also defines a substantially flat inner face 239 contiguous with the inner face 233 of horizontal plate member 227, a substantially flat outer face 241 contiguous with the upper face 231 of horizontal plate member 227, and inside face contiguous with the inside face of horizontal plate member 227, and an end face 245. Horizontal plate member 227 has an outwardly extending bolt receiving bore 247 formed therethrough that extends between the inner face 233 and the lower face 231 thereof. Bore 247 defines an axis generally parallel to the plane in which vertical plate member 229 lies and is disposed at an acute angle with respect to inner face 233 of horizontal plate member 227. It is preferred that the acute angle fall in the range of 1° and 89°, but preferably between about 30° and about 80°, and is most preferably about 65°. As best seen in FIG. 26, bolt 249 extends through bore 247 in horizontal plate member 227 into slot 32 in first face 30a of a frame member, e.g., lower member 20. Nut 104 is provided within a terminal end of the slot 32 in first face 30a of lower frame member 20 and threaded onto the shaft of bolt 249 so as to rigidly connect corner piece 225 to lower frame member 20.

Upright or vertical plate member 229 of corner piece 225 also includes an outwardly extending bolt receiving bore 251 formed therethrough from its inner face 239 to its outer face 241 through which corresponding bolts (not shown) may extend into slot 32 in a face of a frame member, as heretofore described. Bore 251 defines an axis generally parallel to the plane in which horizontal plate member 227 lies and is disposed at an acute angle with respect to the inner face 239 of vertical plate member 229. Again, this acute angle may be anywhere between 1° and 89°, but is preferably between about 30 and about 80, and is most preferably about 65°. A nut 104 may be provided within a terminal end of the slot 32 in a face of a frame member and threaded onto the shafts of a corresponding bolt so as to rigidly connect vertical plate member 229 of corner piece 225 to a corresponding frame member.

Vertical plate member 229 has a lip 253 projecting outwardly therefrom. Lip 253 has a lower surface contiguous with the bottom face of vertical plate member 229 and is defined first and second converging sidewalls 255 and 257, respectively, extending from outer face 241 of vertical plate member 229 along the entire length thereof and terminating at terminal end face 259. Although lip 253 need not necessarily extend along the entire length of outer face 241 of vertical plate member 229, but preferably does so to provide the maximum amount of clamping force against first and second sidewalls 34 and 36, respectively, extending from a face and partially defining slot 32 in a frame member. Similarly, horizontal plate member 227 has a lip 261 projecting outwardly therefrom. Lip 261 has an end surface contiguous with the end face 237 of horizontal plate member 227 and is defined by first and second converging sidewalls 263 and 265, respectively, extending from lower face 231 of horizontal plate member 227 along the entire length thereof and terminating at terminal end face 267. Although lip 261 need not necessarily extend along the entire length across the lowr face 231 of horizontal plate member 227, but preferably does so to provide the maximum amount of clamping force against first and second sidewalls 34 and 36, respectively, extending from a face and partially defining slot 32 in a frame member.

Corner piece 225 may also include first and second gussets 269 and 271, respectively, extending between the inner faces 233 and 239 of horizontal plate member 227 and vertical plate member 229, respectively. First and second gussets 269 and 271, respectively, include inner faces 269a and 271a directed toward each other and outer faces 269b and 271b.

Referring to FIGS. 27-41, an alternate embodiment of a left corner piece is generally designated by the reference numeral 226. Each left corner piece 226 includes an L-shaped body defined by horizontal plate member 228 and an upright or vertical plate member 230. Horizontal plate member 228 defines a substantially flat upper face 232, a substantially flat opposite inner face 234, an inside face 236, and an end face 238. In the depicted embodiment, each of these faces is substantially planar in shape. Upright or vertical plate member 230 also defines a substantially flat inner face 240 contiguous with the inner face 234 of horizontal plate member 228, a substantially flat outer face 242 contiguous with the upper face 232 of horizontal plate member 228, an inside face 244 contiguous with the inside face 236 of horizontal plate member 228, and a bottom face 246. Horizontal plate member 228 has an upwardly extending bolt receiving bore 248 formed therethrough that extends between the inner face 234 and the upper face 232 thereof. Bore 248 defines an axis generally parallel to the plane in which vertical plate member 230 lies and is disposed at an acute angle with respect to the lower face of horizontal plate member 228. It is contemplated that the acute angle fall in the range of 1° and 89°, but preferably between about 30° and about 80°, and most preferably about 65°. It is intended that a bolt (not shown) may be inserted through bore 248 in horizontal plate member 228 into a slot 32 formed in a face of a frame member. It can be appreciated that a nut, such as nut 104 or a nut with a single threaded bore therethrough, is provided within the slot 32 of the frame member 18 and the bolt is threaded therein so as to rigidly connect left corner piece 226 to the frame member.

Upright or vertical plate member 230 of left corner piece 226 also includes an outwardly extending bolt receiving bore 250 formed therethrough from its inner face 240 to its outer face 242. Bore 250 defines an axis generally parallel to the plane in which horizontal plate member 228 lies and is disposed at an acute angle with respect to the inner face 240 of vertical plate member 230. It is contemplated that the acute angle fall in the range of 1° and 89°, but is preferably between about 30° and about 80°, and most preferably about 65°. It can be appreciated that a nut, such as nut 104 or a nut with a single threaded bore therethrough, may be provided within a slot 32 of a frame member such that the bolt may be threaded into the threaded bore of the nut so as to rigidly connect left corner piece 226 to the frame member.

Vertical plate member 230 has a lip 252 projecting outwardly therefrom. Lip 252 has a lower surface contiguous with the bottom face 246 of vertical plate member 230. Lip 252 is disposed substantially 90° with respect to the outer face 242 of vertical plate member 230 along the entire length thereof. Although lip 252 need not necessarily extend along the entire length across the outer face 242 of vertical plate member 230, but preferably does so to provide the maximum amount of clamping force against a ledge, e.g. ledge 52 in first side frame member 14, of a frame member. Similarly, horizontal plate member 228 has a lip 254 projecting outwardly therefrom. Lip 254 has an end surface contiguous with the end face 238 of horizontal plate member 228. Lip 254 is disposed substantially 90° with respect to the upper face 232 of horizontal plate member 228 along the entire length thereof. Although lip 254 need not necessarily extend along the entire length across the upper face 232 of horizontal plate member 228, but preferably does so to provide the maximum amount of clamping force against a ledge, e.g. ledge 52 in upper side frame member 18, of a frame member.

Referring to FIGS. 49-55, a still further embodiment of a left corner piece is generally designated by the reference numeral 326. Left corner piece 326 is intended to interconnect first side frame member 14 to upper and lower cross frame members 18 and 20, respectively, as heretofore described. Each left corner piece 326 includes an L-shaped body defined by horizontal plate member 294 and an upright or vertical plate member 296. Horizontal plate member 294 defines a substantially flat upper face 295, a substantially flat opposite inner face 297, an inside face 301, and a terminal edge 303. Inner face 297 is interconnected to terminal edge 303 by chamfered face 305 extending upwardly from edge 306 of inner face 297 at an angle of approximately 45° thereto, although other angles are contemplated as being within the scope of the present invention. In the depicted embodiment, each of these faces is substantially planar in shape.

Upright or vertical plate member 296 also defines a substantially flat inner face 307 contiguous with the inner face 297 of horizontal plate member 294, a substantially flat outer face 309 contiguous with the upper face 295 of horizontal plate member 294, an inside face 311 contiguous with the inside face 301 of horizontal plate member 294, and a bottom, terminal edge 315. Inner face 307 is interconnected to terminal edge 315 by chamfered face 317 extending downwardly from edge 316 of inner face 307 at an angle of approximately 45° thereto, although other angles are contemplated as being within the scope of the present invention. In the depicted embodiment, each of these faces is substantially planar in shape.

Horizontal plate member 294 has a pair of adjacent, upwardly extending bolt receiving bores 298 and 299 formed therethrough that extend between the inner face 297 and the upper face 295 thereof. Each bore 298 and 299 defines an axis generally parallel to the plane in which vertical plate member 296 lies and is disposed at an acute angle with respect to inner face 297 of horizontal plate member 294. It is contemplated for the acute angle to fall in the range of 1° and 89°, but preferably between about 30° and about 80°, and most preferably about 65°. Bolts (not shown) extend through corresponding bores 298 and 299, respectively, in horizontal plate member 294 into slot 32 in first face 30a of upper cross frame member 18. As hereinafter described, nuts 104 are provided within a terminal end of the slot 32 in first face 30a of upper cross frame member 18 and threaded onto the shafts of corresponding bolts so as to rigidly connect left corner piece 326 to upper cross frame member 18.

Upright or vertical plate member 296 of left corner piece 326 also includes a pair of adjacent, aligned outwardly extending bolt receiving bores 304 and 308 formed therethrough from its inner face 307 to its outer face 309 through which corresponding bolts (not shown) extend into slot 32 in first face 30a of first side frame member 14. Each bore 304 and 308 defines an axis generally parallel to the plane in which horizontal plate member 294 lies and is disposed at an acute angle with respect to the inner face 307 of vertical plate member 296. Again, this acute angle may be anywhere between 1° and 89°, but is preferably between about 30° and about 80°, and is most preferably about 65°. Nuts 104 are provided within a terminal end of the slot 32 in first face 30a of first side frame member 14 and threaded onto the shafts of corresponding bolts so as to rigidly connect left corner piece 326 to first side frame member 14.

Vertical plate member 296 has a lip 314 projecting outwardly therefrom. Lip 314 has a lower surface contiguous with terminal edge 315 of vertical plate member 296. Lip 314 is disposed substantially 90° with respect to the outer face 309 of vertical plate member 296 along the entire length thereof. Although lip 314 need not necessarily extend along the entire length across the outer face 309 of vertical plate member 296, but preferably does so to provide the maximum amount of clamping force against first ledge 52 in first side frame member 14. Similarly, horizontal plate member 294 has a lip 318 projecting outwardly therefrom. Lip 318 has an end surface contiguous with terminal edge 303 of horizontal plate member 294. Lip 318 is disposed substantially 90° with respect to the outer face 295 of horizontal plate member 294 along the entire length thereof. Although lip 318 need not necessarily extend along the entire length across the outer face 295 of vertical plate member 294, but preferably does so to provide the maximum amount of clamping force against first ledge 52 in upper side frame member 18. It is contemplated for outer face 320 of lip 318 to be generally contiguous with outer face 322 of lip 314.

Left corner piece 326 first includes first and second gussets 326 and 328, respectively, extending between the inner faces 297 and 307 of horizontal plate member 294 and vertical plate member 296. First and second gussets 326 and 328, respectively, include inner faces 326*a* and 328*a* directed toward each other and outer faces 326*b* and 328*b*. Outer face 326*b* of first gusset 326 is contiguous with outer face 320 of lip 318 and with outer face 322 of lip 314.

It can be appreciated that all of the vertical and horizontal plate members of the corner pierces heretofore described may utilize the lips as described with respect to corner member 225. In such embodiments, the first, second, third and fourth ledges 52, 62, 72 and 82 are unnecessary as the converging walls of lips 253 and 261 provide a clamping force against first and second sidewalls 34 and 36 respectively, extending from a face and partially defining slot 32 in a frame member.

Referring to FIGS. 1-5, it is contemplated to pivotably connect door frame 12 to door jamb frame 410 by first and second spaced hinges 350 and 352, respectively. Door jamb frame 410 is defined by first and second opposite, spaced apart, longitudinally extending side frame members 414 and 416, respectively, and upper cross frame member 418. First side frame member 414 is rigidly interconnected to upper cross frame member 418 by upper plate 22 and corner piece 26, respectively. Similarly, second side frame member 16 is rigidly interconnected to upper cross frame member 418 by upper plate 22 and corner piece 26, respectively. In the depicted embodiment, first and second side frame members 414 and 416, respectively, and upper cross frame member 418 are identical in structure to each other and to first side frame member 14, heretofore described. As such, the prior description of first side frame member 14 is understood to describe first and second side frame members 414 and 416, respectively, and upper cross frame member 418 of door jamb frame 410, as if fully described herein.

Hinges 350 and 352 are identical in structure, and as such, the following description of first hinge 350 is understood to describe second hinge 352, as if fully described herein. Hinge 350 includes first and second pivotable elements 354 and 356, respectively. First pivotable element 354 includes wall 358 having a generally flat inner face 360, an opposite, generally flat outer face 362, first and second sides, 363 and 365, respectively, and an end face 364. As best seen, in FIGS. 3-4, the intersection 366 of outer face 362 and end face 364 is generally arcuate. Lip 368 projects outwardly from wall 358 and an outer surface contiguous with end face 364 of wall 358. More specifically, lip 368 is disposed substantially 90° with respect to the outer face 362 of wall 358 along the entire width thereof. Although lip 368 need not necessarily extend along the entire length across the outer face 362 of wall 358, but preferably does so to provide the maximum amount of clamping force against first ledge 52 in first side frame member 14 of door frame 12.

Wall 358 further includes bolt receiving bore 369 formed therethrough from its inner face 360 to its outer face 362. Bore 369 defines an axis disposed at an acute angle with respect to the inner face 360 of wall 358. It is contemplated that the acute angle fall in the range of 1° and 89°, but is preferably between about 30° and about 80°, and most preferably about 65°. It can be appreciated that a nut, such as nut 104 or a nut with a single threaded bore therethrough, may be provided within a slot 32 of side frame member 16 such that the bolt may be threaded into the threaded bore of the nut so as to rigidly connect first element 354 of hinge 350 to side frame member 16.

Inner face 360 and outer face 362 of first element 354 of hinge 350 are first connected by generally cylindrical member 370. More specifically, cylindrical member 370 includes a generally cylindrical outer surface 372 generally contiguous with inner face 360 and outer face 362 of wall 358. Cylindrical member 370 further includes upper surface 374 generally contiguous with first side 363 of wall 358 and lower surface 376 generally contiguous with second side 365 of wall 358. Passageway 378 extends between upper and lower surfaces 374 and 376 of cylindrical member 370 and is adapted for receiving a first portion of pivot pin 380.

Second pivotable element 356 includes wall 382 having a generally flat inner face 384, an opposite, generally flat outer face 386, first and second sides, 388 and 390, respectively, and an end face 392. As best seen, in FIGS. 3 and 5, the intersection 394 of outer face 386 and end face 392 is generally arcuate. Lip 396 projects outwardly from wall 382 and an outer surface contiguous with end face 392 of wall 382. More specifically, lip 396 is disposed substantially 90° with respect to the outer face 386 of wall 382 along the entire width thereof. Although lip 396 need not necessarily extend along the entire length across the outer face 386 of wall 382, but preferably does so to provide the maximum amount of clamping force against first ledge 52 in first side frame member 414.

Wall 382 further includes bolt receiving bore 397 formed therethrough from its inner face 384 to its outer face 386. Bore 397 defines an axis disposed at an acute angle with respect to the inner face 384 of wall 382. It is contemplated that the acute angle fall in the range of 1° and 89°, but is preferably between about 30° and about 80°, and most preferably about 65°. It can be appreciated that a nut, such as nut 104 or a nut with a single threaded bore therethrough, may be provided within a slot 32 of side frame member 414 such that the bolt may be threaded into the threaded bore of the nut so as to rigidly connect second element 356 of hinge 350 to side frame member 414.

Inner face 384 and outer face 386 of second element 356 of hinge 350 are inner connected by generally cylindrical member 398. More specifically, cylindrical member 398 includes a generally cylindrical outer surface 400 generally contiguous with inner face 384 and outer face 386 of wall 382. Cylindrical member 398 further includes upper surface 402 generally contiguous with first side 388 of wall 382 and lower surface 404 generally contiguous with second side 390 of wall 382. Passageway 406 extends between upper and lower surfaces 402 and 404 of cylindrical member 398 and is adapted for receiving a second portion of pivot pin 380 such that first and second elements 354 and 356 are operatively connected to other. It can be appreciated that first and elements 354 and 356, respectively, of hinge 350 are pivotable about pivot pin 380 such that lower surface 376 of cylindrical member 370 of first element 354 forms a slidable interface with upper surface 402 of cylindrical member 398 of second element. Second hinge 352 may be also used to interconnect door frame 12 to door jamb frame 410, as heretofore to described, so as to allow door frame 12 to pivot on first and second hinges 350 and 352, respectively, with respect to door jamb frame 410.

Figure 56:
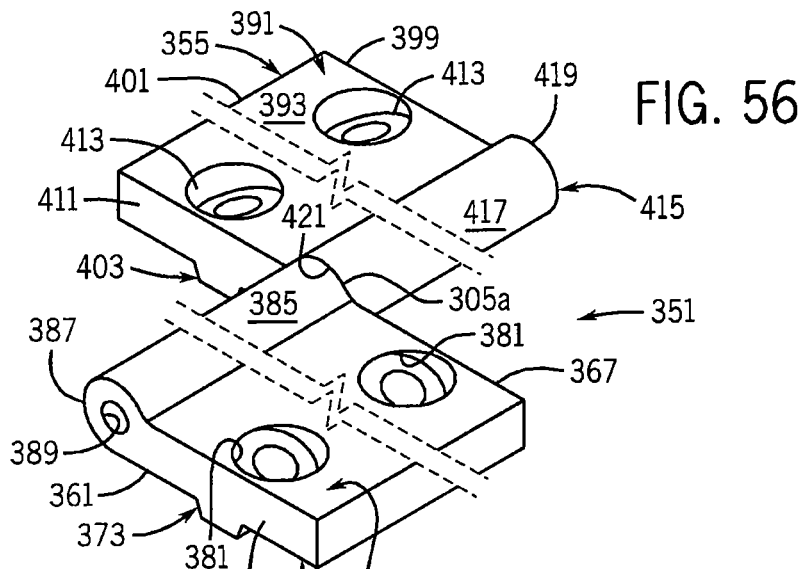
FIG. 56 is an isometric view of an alternate embodiment of a hinge in accordance with the present invention in an open configuration.
Figure 57:
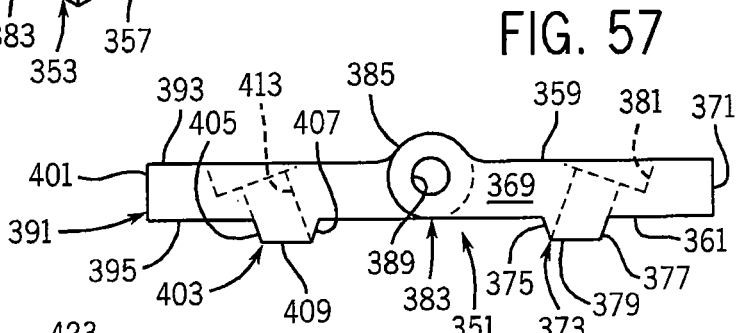
FIG. 57 is an end view of the hinge of FIG. 56.
Figure 58:
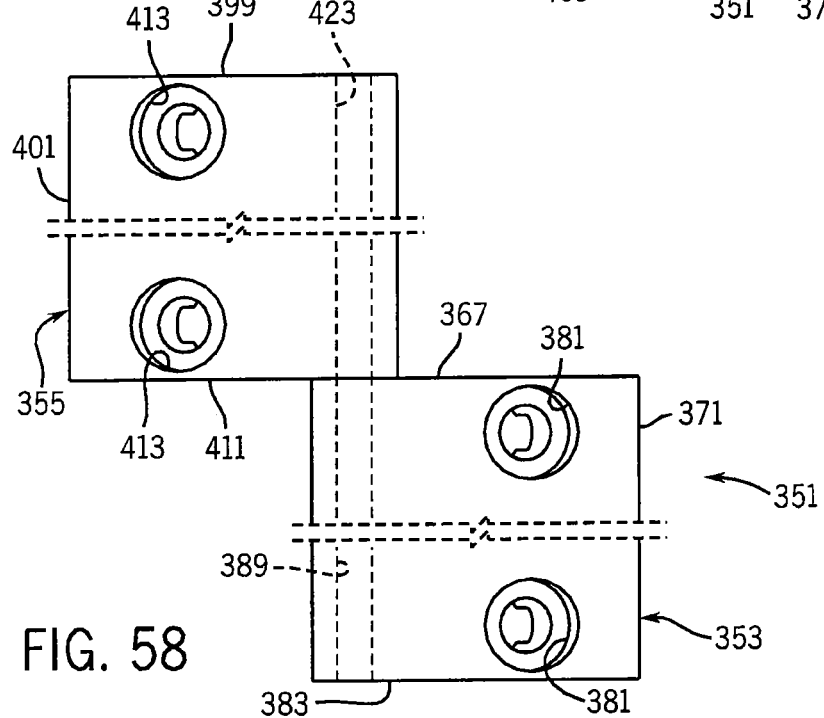
FIG. 58 is a top plan view of the hinge of FIG. 56.

Referring to FIGS. 56-58, an alternate embodiment of a hinge in accordance with the present invention is generally designated by the reference number 351. Hinge 351 includes first and second pivotable elements 353 and 355, respectively. First pivotable element 353 includes wall 357 having a generally flat inner face 359, an opposite, generally flat outer face 361, first and second sides, 367 and 383, respectively, and an end face 371. Lip 373 projects outwardly from outer face 361 is defined by first and second converging sidewalls 375 and 377, respectively, extending from outer face 361 of along the entire length thereof and terminating at terminal end face 379. Although lip 373 need not necessarily extend along the entire length of outer face 361, but preferably does so to provide the maximum amount of clamping force against first and second sidewalls 34 and 36, respectively, extending from a face and partially defining slot 32 in a frame member when interconnected thereto.

Wall 357 further includes spaced, bolt receiving bores 381 formed therethrough from its inner face 359 to its outer face 361. Bores 381 define axes disposed at acute angles with respect to the inner face 359 of wall 357. It is contemplated that the acute angles fall in the range of 1° and 89°, but is preferably between about 30° and about 80°, and most preferably about 65°. It can be appreciated that a nut, such as nut 104, may be provided within a slot 32 of a frame member such that the bolts may be threaded into the threaded bores of the nut so as to rigidly connect first element 353 of hinge 351 to the frame member.

Inner face 359 and outer face 361 of first element 353 of hinge 351 are connected by generally cylindrical member 383. More specifically, cylindrical member 383 includes a generally cylindrical outer surface 385 generally contiguous with inner face 359 and outer face 361 of wall 357. Cylindrical member 383 further includes upper surface 385a generally contiguous with first side 367 of wall 357 and lower surface 387 generally contiguous with second side 383 of wall 357. Passageway 389 extends between upper and lower surfaces 385a and 387 of cylindrical member 383 and is adapted for receiving a first portion of pivot pin, e.g. pivot pit 380.

Second pivotable element 355 includes wall 391 having a generally flat inner face 393, an opposite, generally flat outer face 395, first and second sides, 399 and 411, respectively, and an end face 401. Lip 403 projects outwardly from outer face 395 is defined by first and second converging sidewalls 405 and 407, respectively, extending from outer face 395 of along the entire length thereof and terminating at terminal end face 409. Although lip 403 need not necessarily extend along the entire length of outer face 395, but preferably does so to provide the maximum amount of clamping force against first and second sidewalls 34 and 36, respectively, extending from a face and partially defining slot 32 in a frame member when interconnected thereto.

Wall 391 further includes space, bolt receiving bores 413 formed therethrough from its inner face 393 to its outer face 395. Bores 413 define axes disposed at acute angles with respect to the inner face 393 of wall 391. It is contemplated that the acute angle fall in the range of 1° and 89°, but is preferably between about 30° and about 80°, and most preferably about 65°. It can be appreciated that nut, such as nut 104, may be provided within a slot 32 of a frame member such that the bolts may be threaded into the threaded bores of the nut so as to rigidly connect second element 355 of hinge 351 to a frame member.

Inner face 393 and outer face 395 of second element 355 of hinge 351 are interconnected by generally cylindrical member 415. More specifically, cylindrical member 415 includes a generally cylindrical outer surface 417 generally contiguous with inner face 393 and outer face 395 of wall 391. Cylindrical member 415 further includes upper surface 419 generally contiguous with first side 399 of wall 391 and lower surface 421 generally contiguous with second side 411 of wall 391. Passageway 423 extends between upper and lower surfaces 419 and 421 of cylindrical member 415 and is adapted for receiving a second portion of a pivot pin, e.g. pivot pin 380, such that first and second elements 353 and 355 are operatively connected to other. It can be appreciated that first and elements 353 and 355, respectively, of hinge 351 are pivotable about pivot pin 380 such that lower surface 421 of cylindrical member 415 of second element 355 forms a slidable interface with upper surface 385a of cylindrical member 385 of first element 353.

Referring to FIG. 11, each upper plate 22 is defined by a generally flat inner face 430, an opposite, generally flat outer face 432, first and second sides 434 and 436, respectively, and first and second ends 438 and 440, respectively. Vertical lip 442 projects outwardly from inner face 430 and has an upper surface 444 contiguous with first side 434; a lower surface 446 contiguous with second side 436 and side surface contiguous with first end 438. Vertical lip 442 is disposed substantially 90° with respect to inner face 430 the entire width thereof. Although vertical lip 442 need not necessarily extend along the entire width across inner face 430, but preferably does so to provide the maximum amount of clamping force against ledge 72 in first side frame member 414.

Upper plate 22 further includes at least one second horizontal lips 450. First horizontal lip 450 projects outwardly from inner face 430 and has an upper surface 454 contiguous with first side 434; a lower surface (not shown) and end surface contiguous with second end 440. First horizontal lip 450 is disposed substantially 90° with respect to inner face 430 along a portion of the length thereof so as so to provide the maximum amount of clamping force against first ledge 52 in upper cross frame member 418.

Upper plate 22 also includes a first pair of adjacent, aligned outwardly extending, vertically spaced, bolt receiving bores 460 and 462 formed therethrough from its outer face 432 to its inner face 430 through which corresponding bolts 464 and 466, respectively, extend into slot 32 in face 30d of first side frame member 414. Each bore 460 and 462 is disposed at an acute angle with respect to outer face 432. Again, this acute angle may be anywhere between 1° and 89°, but is preferably between about 30° and about 80°, and is most preferably about 65°. Nut 104 is provided within a terminal end of the slot 32 in first face 30d of first side frame member 414 and threaded onto the shafts of corresponding bolts so as to rigidly connect upper plate 22 to first side frame member 414.

A second pair of adjacent, aligned outwardly extending, horizontally spaced, bolt receiving bores 468 and 470 formed in upper plate 22 from its outer face 432 to its inner face 430 through which corresponding bolts 472 and 474, respectively, extend into slot 32 in first face 30a of upper cross frame member 418. Each bore 468 and 470 is disposed at an acute angle with respect to outer face 432. Again, this acute angle may be anywhere between 1° and 89°, but is preferably between about 30° and about 80°, and is most preferably about 65°. Nut 104 is provided within a terminal end of the slot 32 in first face 30a of upper cross frame member 418 and threaded onto the shafts of corresponding bolts so as to rigidly connect upper plate 22 to upper cross frame member 418.

Referring to FIGS. 1-2 and 12-15, it is contemplated to interconnect first and second side frame members 414 and 416, respectively, of door jamb frame 410 to support structure 500, as hereinafter described. Support structure 500 includes first and second, spaced apart, longitudinally extending support frame members 502 and 504, respectively, operatively connected by spaced, tubular supports 506 and 508. First and second support frame members 502 and 504, respectively, are identical in structure, and as such, the description hereinafter of first support frame member 502 is understood to describe second support frame member 504, as if fully described herein.

First support frame member 502 has a generally rectangular configuration and extends along a longitudinal axis. First support frame member 502 is defined by upper and lower faces 512 and 514, respectively, and first and second side faces 516 and 518, respectively. Upper face 512 includes a centrally located slot 32, as heretofore described, extending longitudinally along the entire length thereof. Similarly, lower face 514 includes a centrally located slot 32, as heretofore described, extending longitudinally along the entire length thereof; first side face 516 includes a centrally located slot 32, as heretofore described, extending longitudinally along the entire length thereof; and second side face 518 includes a centrally located slot 32, as heretofore described, extending longitudinally along the entire length thereof.

First support frame member 502 includes a plurality of ledges 520 formed therein. More specifically, upper face 512 and first side face 516 intersect at first ledge 520; first side face 516 and lower face 514 intersect at second ledge 520; lower face 514 and second side face 518 intersect at third ledge 520; and second side face 518 and upper face 512 intersect at fourth ledge 520. Each ledge 520 is identical in structure and is defined by first and second sidewalls 522 and 524, respectively, which are perpendicular to each other. First and second side faces 516 and 518, respectively, further include a pair of grooves 525 formed therein and located on opposite sides of slots 32. Each groove 525 is identical in structure and is defined by first and second parallel sidewalls 527 and 529, respectively, interconnected by inner wall 531 which is perpendicular thereto. First support frame member 502 may also include a plurality of passageways 526*a*-526*h* therethrough along the entire longitudinal length thereof.

In order to interconnect tubular support 506 to upper and lower faces 512 and 514, respectively, of first and second support frame members 502 and 504, respectively, face connectors 528 are provided. More specifically, each face connector 528 includes collar 530 having an open end 532 adapted for receiving an end of a corresponding tubular support 506 and 508. A generally rectangular wall 534 includes an inner face 537 closing a second, opposite end 536 of collar 530 and an outer face 538. Mounting wall 540 extends laterally from outer face 538 and is generally perpendicular thereto. Mounting wall 540 is partially defined by an upper face 542 and an opposite, downwardly directed lower face 544. Spaced gussets 543 extend between lower face 544 of mounting wall 540 and outer face 538 of wall 534 to provide strength and stability to each face connector 528. Vertical lip 546 projects upwardly from upper face 542 of mounting wall 540. It is contemplated for vertical lip 546 to be disposed at an angle substantially 90° with respect to upper face 542 along the entire width thereof. Although vertical lip 546 need not necessarily extend along the entire width of upper face 542, but preferably does so to provide the maximum amount of clamping force against a corresponding ledge 520 in first or second support frame member 502 and 504, respectively.

Mounting wall 540 further includes at least one outwardly extending, bolt receiving bore 550 formed therein. Each bolt receiving bore 550 extends from lower face 544 to upper face 542 for receiving a corresponding bolt 554 therethrough. Each bore 550 is disposed at an acute angle with respect to lower face 544 of mounting wall 540. Again, this acute angle may be anywhere between 1° and 89°, but is preferably between about 30° and about 80°, and is most preferably about 65°. Each bore 550 is adapted for receiving a corresponding bolt 554 therethough and for projecting into slot 32 in upper or lower face 512 and, respectively, of a corresponding first or second support frame member 502 and 504 respectively. Nut 104 is provided within a terminal end of slot 32 and threaded onto the shaft of each bolt 554 so as to 1) connect lower frame connector 538 to a corresponding first or second support frame member 502 and 504 respectively; and 2) clamp vertical lip 546 against a corresponding ledge 520 in first or second support frame member 502 and 504, respectively.

In operation, collars 530 of face connectors 528 are fixed to opposite ends of tubular support 506. Upper face 542 of mounting wall 540 of a first face connector 528 is positioned adjacent lower face 514 of first support frame member 502 such that vertical lip 546 of the first face connector 528 is received in second ledge 520 of first support frame member 502. Likewise, upper face 542 of mounting wall 540 of a second face connector 528 is positioned adjacent lower face 514 of second support frame member 504 such that vertical lip 546 of the second face connector 528 is received in third ledge 520 of second support frame member 504. A first bolt 554 is inserted through bore 550 through mounting wall 540 of first face connector 528 and into slot 32 in lower face 514 of first support frame member 502. Nut 104 is provided within a terminal end of slot 32 and threaded onto the shaft of the first bolt 554 so as to 1) connect first frame connector 538 to first support frame member 502; and 2) clamp vertical lip 546 against a second ledge 520 in first support frame member 502. A second bolt 554 is inserted through bore 550 through mounting wall 540 of second face connector 528 and into slot 32 in lower face 514 of second support frame member 504. Nut 104 is provided within a terminal end of slot 32 and threaded onto the shaft of the second bolt 554 so as to 1) connect second frame connector 538 to second support frame member 504; and 2) clamp vertical lip 546 against a third ledge 520 in second support frame member 504.

In order to interconnect tubular support 508 to first or second side faces 516 and 518, respectively, of first and second support frame members 502 and 504, respectively, side connectors 560 are provided. More specifically, each side connector 560 includes collar 562 having an open end 564 adapted for receiving an end of a corresponding tubular support 508. A generally rectangular mounting wall 566 includes a first face 568 closing a second, opposite end 570 of collar 562 and a second, opposite face 572. Mounting wall 566 extends laterally from collar 562 and includes lip 574 projecting outwardly from second face 572 of mounting wall 540. It is contemplated for lip 574 to be disposed at an angle substantially 90° with respect to second face 572 along the entire width thereof. Although lip 574 need not necessarily extend along the entire width of second face 572, but preferably does so as to provide the maximum amount of clamping force in corresponding grooves 525 in first or second support frame members 502 and 504, respectively.

Mounting wall 566 further includes first and second spaced bolt receiving bores 578 and 580 formed therein. Bores 578 and 580 are positioned on opposite sides of collar 562 and extend from first face 568 to second face 570 for receiving a corresponding bolts 582 therethrough. Bores 578 and 580 are disposed at an acute angle with respect to first face 568 of mounting wall 566. Again, this acute angle may be anywhere between 1° and 89°, but is preferably between about 30° and about 80°, and is most preferably about 65°. Bores 578 and 580 are adapted for receiving corresponding bolts 582 therethough and for projecting into slot 32 in first or second side faces 516 and 518, respectively, of a corresponding first or second support frame member 502 and 504, respectively. Nut 104 is provided within a terminal end of slot 32 and threaded onto the shaft of each bolt 582 so as to 1) connect each side frame connector 560 to a corresponding first or second support frame member 502 and 504 respectively; and 2) clamp lip 574 in corresponding groove 525 in first or second support frame member 502 and 504, respectively.

In operation, collars 562 of side connectors 560 are fixed to opposite ends of tubular support 508. Second face 572 of mounting wall 566 of a first side connector 560 is positioned adjacent first side face 516 of first support frame member 502 such that lip 574 of the first side connector 560 is received in corresponding groove 525 in first side face 516 of first support frame member 502. Likewise, second face 572 of mounting wall 566 of a second side connector 560 is positioned adjacent second side face 518 of second support frame member 504 such that lip 574 of second side face 518 of the second face connector 528 is received in corresponding groove 525 of second support frame member 504. Bolts 582 are inserted through bores 578 and 580 through mounting wall 566 of first side connector 560 and into slot 32 in first side face 516 of first support frame member 502. Nut 104 is provided within a terminal end of slot 32 and threaded onto the shafts of the bolts 582 so as to 1) connect first side connector 560 to first support frame member 502; and 2) clamp lips 574 and 576 in grooves 525 in first support frame member 502. Similarly, bolts 582 are inserted through bores 578 and 580 through mounting wall 566 of second side connector 560 and into slot 32 in second side face 518 of second support frame member 504. Nut 104 is provided within a terminal end of slot 32 and threaded onto the shafts of the bolt 582 so as to 1) connect second side connector 560 to second support frame member 504; and 2) clamp lips 574 in corresponding groove 525 in second support frame member 504.

Referring to FIGS. 1-2 and 16-17, alternatively, it is contemplated to interconnect support frame members 502 and 504, respectively, with tubular frame member 590, as hereinafter described. Tubular frame member 590 has a generally circular cross section and extends along a longitudinal axis. Tubular frame member 590 is partially defined by a plurality of circumstantially space faces 592a-592d. Each face 592a-592d includes a centrally located slot 32, as heretofore described, extending longitudinally along the entire length thereof. Face 592a is interconnected to face 592b by arcuate wall 594a; face 592b is interconnected to face 592c by arcuate wall 594b; face 592c is interconnected to face 592d by arcuate wall 594c; and face 592d is interconnected to face 592a by arcuate wall 594d. Shoulder 598 is formed at the intersection of face 592a and arcuate wall 594a; shoulder 600 is formed at the intersection of arcuate wall 594a and face 592b; shoulder 602 is formed at the intersection of face 592b and arcuate wall 594b; shoulder 604 is formed at the intersection of arcuate wall 594b and face 592c; shoulder 606 is formed at the intersection of face 592c and arcuate wall 594c; shoulder 608 is formed at the intersection of arcuate wall 594c and face 592d; shoulder 610 is formed at the intersection of face 592d and arcuate wall 594d; and shoulder 612 is formed at the intersection of arcuate wall 594d and face 592a.

Figure 16:
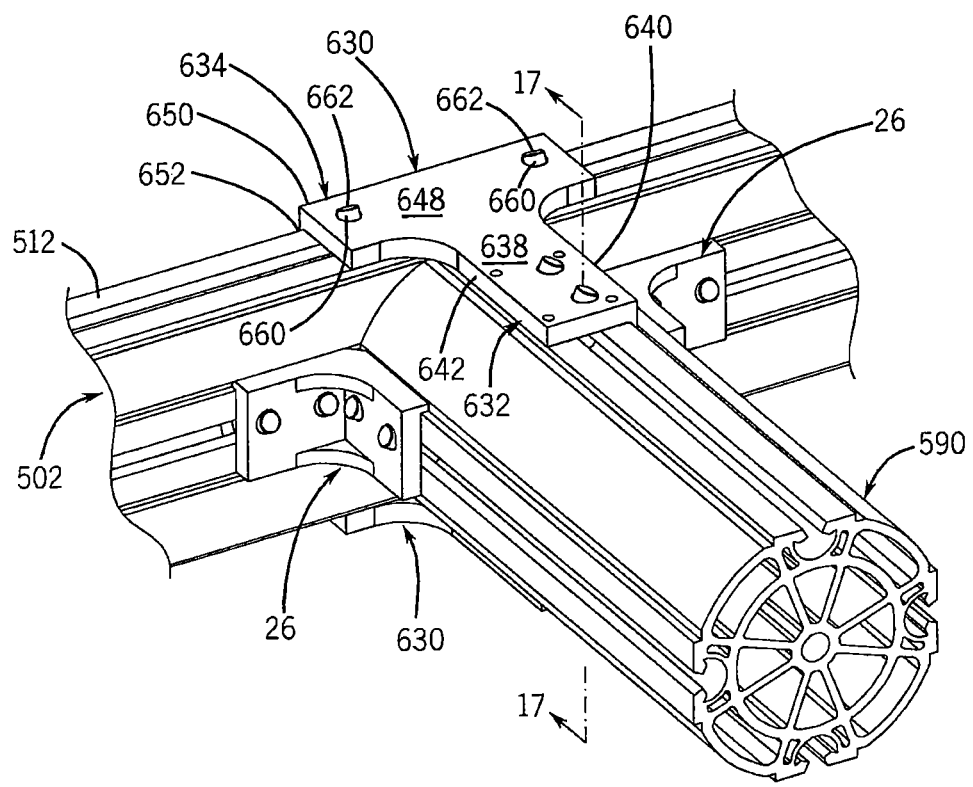
FIG. 16 is an enlarged isometric view of the assembled frame taken along line 16-16 of FIG. 2.
Figure 17:
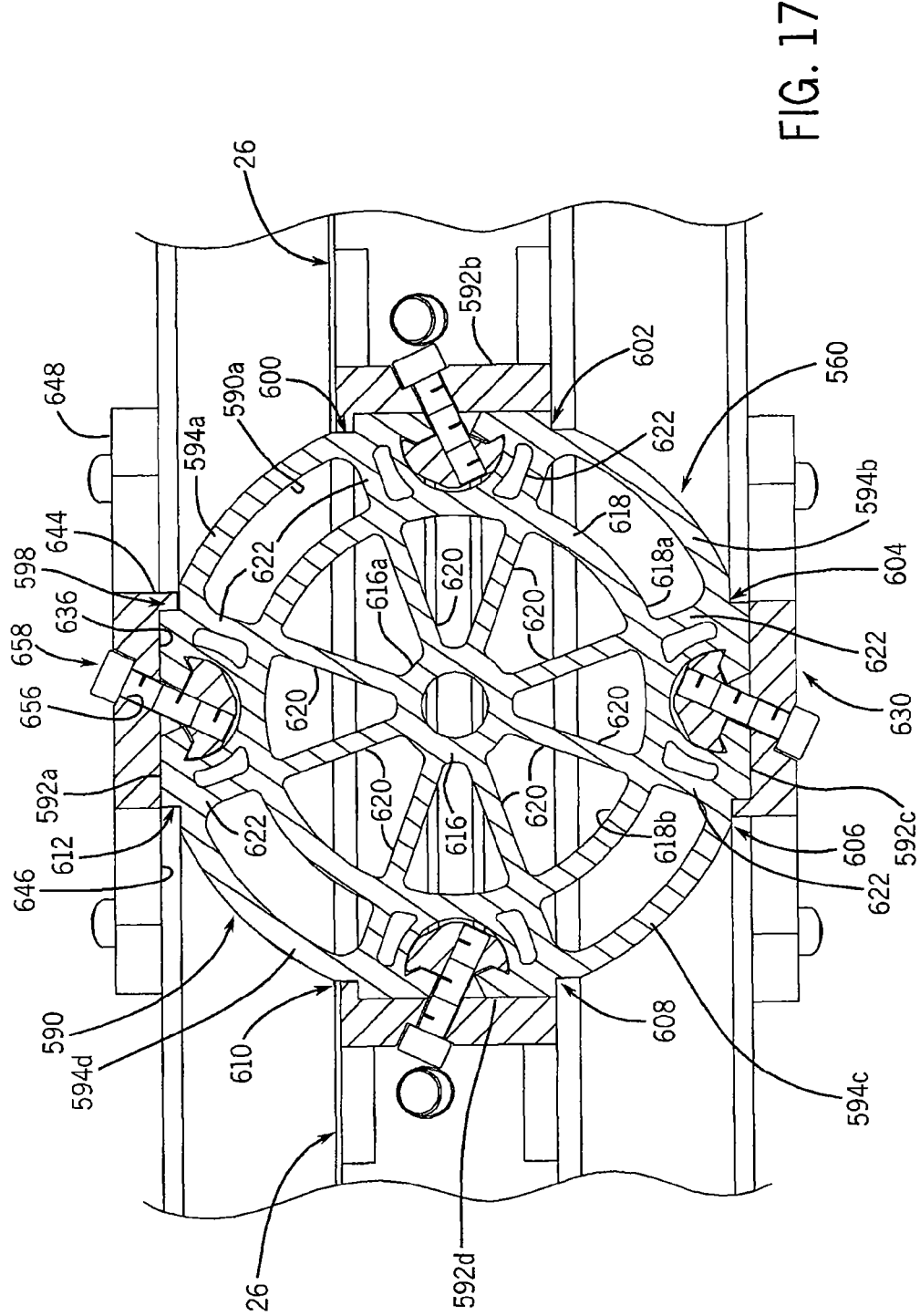
FIG. 17 is a cross sectional view of the assembled frame taken along line 17-17 of FIG. 16.

As best seen in FIGS. 16-17, central hub 616 is disposed within and concentric with tubular rim 618 along the entire length thereof. Similarly, tubular rim 618 is disposed within and concentric with tubular frame member 590 along the entire length thereof. Outer surface 616a of central hub 616 and inner surface 618b of tubular rim 618 are interconnected by a plurality of circumferentially spaced inner spokes 620. Outer surface 618a of tubular rim 618 and inner surface 590a of tubular frame member 590 are interconnected by a plurality of circumferentially spaced outer spokes 622. Outer spokes 622 are radially aligned with inner spokes 620. In the depicted embodiment, it is intended for the arrangement of central hub 616, tubular rim 618, inner spokes 620 and outer spokes 622 to provide strength and rigidity to tubular frame member 590.

In the depicted embodiment, faces 592b and 592d of tubular frame member 590 are connected to second side face 518 of first support frame member 502 by corners 26, as heretofore described. More specifically, a left corner piece 26 is positioned such that upper face 95 of horizontal plate member 94 engages face 592d of tubular frame member 590 and such that outer face 109 of vertical plate member 96 engages second side face 518 of first support frame member 502. Lip 116 is seated in shoulder 610 of tubular frame member 590 and lip 114 is seated in groove 525 in second side face 518 of first support frame member 502. Nut 104 is positioned in slot 32 in face 592d of tubular frame member such that bolt receiving bores 98 and 113 in the left corner piece 26 are axially aligned with threaded apertures 170 in nut 104. Bolts 190 are inserted into bolt receiving bores 98 and 113 through horizontal plate member 94 and threaded into corresponding threaded apertures 170 in nut 104. As bolts 190 are threaded into corresponding threaded apertures 170 in nut 104, central abutment wall 168 of nut 104 is drawn towards and engages abutment wall 42. Similarly, third abutment wall 186 of nut 104 is drawn towards and engages second inner abutment wall 48. In addition, first and second abutment walls 164 and 182, respectively, of nut 102 slidably engage second outer abutment wall 46 and first inner abutment wall 44, respectively. Likewise, a second nut 104 is positioned in slot 32 in second side face 518 of first support frame member 502 such that bolt receiving bores 105 and 106 in the left corner piece 26 are axially aligned with threaded apertures 170 in the second nut 104. Bolts 190 are inserted into bolt receiving bores 105 and 106 through vertical plate member 96 and threaded into corresponding threaded apertures 170 in nut 104. As bolts 190 are threaded into corresponding threaded apertures 170 in nut 104, central abutment wall 168 of nut 102 is drawn towards and engages abutment wall 42. Similarly, third abutment wall 186 of nut 104 is drawn towards and engages second inner abutment wall 48. In addition, first and second abutment walls 164 and 182, respectively, of nut 104 slidably engage second outer abutment wall 46 and first inner abutment wall 44, respectively. As described, left corner piece 26 locks face 592d of tubular frame member 590 and second side face 518 of first support frame member 502 together in multiple planes, thereby preventing the pivoting of tubular frame member 590 and first support frame member 502 with respect to each other. In the same manner, a right corner piece 26 is used to lock face 592b of tubular frame member 590 and second side face 518 of first support frame member 502 together in multiple planes, thereby preventing the pivoting of tubular frame member 590 and first support frame member 502 with respect to each other.

In order to interconnect faces 592a and 592c of tubular support member 590 to corresponding upper and lower faces 512 and 514, respectively, of first support frame member 502, mounting plates 630 are provided. Each mounting plate 630 is generally T-shaped and includes first and second legs 632 and 634, respectively, generally perpendicular to each other. First leg 632 is defined by a generally flat inner face 636, an opposite, generally flat outer face 638, and first and second sides 640 and 642, respectively. Lip 644 depends from inner face 636 at an angle of substantially 90° thereto at a location adjacent first side 640. It is contemplated for lip 644 to preferably extend along the entire length of first leg 632 to provide the maximum amount of clamping force against shoulder 598 of tubular frame member 590.

Second leg 634 is defined by a generally flat inner face 646 coincident with inner face 636 of first leg 632, an opposite, generally flat outer face 648 coincident with outer face 638 of first leg 632, and a terminal edge 650. Lip 652 depends from inner face 646 at an angle of substantially 90° thereto at a location adjacent terminal edge 650. It is contemplated for lip 652 to preferably extend along the entire width of second leg 634 to provide the maximum amount of clamping force against a corresponding ledge 520 of first support frame member 502.

First leg 632 of mounting plate 630 also includes a first pair of adjacent, aligned outwardly extending, spaced, bolt receiving bores 656 formed therethrough from its outer face 638 to its inner face 636 through which corresponding bolts 658 extend into slot 32 in face 592a of tubular support member 590. Each bore 656 is disposed at an acute angle with respect to outer face 638. Again, this acute angle may be anywhere between 1° and 89°, but is preferably between about 30° and about 80°, and is most preferably about 65°. Second leg 634 of mounting plate 630 also includes a first pair of adjacent, aligned outwardly extending, spaced, bolt receiving bores 660 formed therethrough from its outer face 648 to its inner face 646 through which corresponding bolts 662 extend into slot 32 in upper face 512 of first support frame member 502. Each bore 660 is disposed at an acute angle with respect to outer face 648. Again, this acute angle may be anywhere between 1° and 89°, but is preferably between about 30° and about 80°, and is most preferably about 65°.

In order to connect tubular support member 590 to upper face 512 of first support frame member 502, nut 104 is provided within a terminal end of the slot 32 in face 592a of tubular support member 590 and threaded onto the shafts of corresponding bolts 658 so as to rigidly connect mounting plate 630 to face 592a of tubular support member 590. Similarly, nut 104 is provided within a terminal end of the slot 32 in upper face 512 of first support frame member 502 and threaded onto the shafts of corresponding bolts 662 so as to rigidly connect mounting plate 630 to upper face 512 of first support frame member 502. To connect tubular support member 590 to lower face 514 of first support frame member 502, nut 104 is provided within a terminal end of the slot 32 in face 592c of tubular support member 590 and threaded onto the shafts of corresponding bolts 658 so as to rigidly connect mounting plate 630 to face 592c of tubular support member 590. Similarly, nut 104 is provided within a terminal end of the slot 32 in lower face 514 of first support frame member 502 and threaded onto the shafts of corresponding bolts 662 so as to rigidly connect mounting plate 630 to lower face 514 of first support frame member 502.

Referring to FIGS. 1-2 and 18-18B, it is contemplated to rigidly interconnect various components to frame assembly 10. By way of example, a slide, generally designated by the reference numeral 670, is interconnected to second support frame member 504 via frame member 672. Frame member 672 is identical to first side frame member 14, heretofore described. As such, the previous description of first side frame member 14 is understood to describe frame member 672 as if fully provided herein.

In the depicted embodiment, face 30c of frame member 672 is connected to upper face 512 of second support frame member 504 by corner 26, as heretofore described. More specifically, a left corner piece 26 is positioned such that upper face 95 of horizontal plate member 94 engages upper face 512 of second support frame member 504 and such that outer face 109 of vertical plate member 96 engages face 30c of frame member 672. Lip 116 is seated in fourth ledge 520 in second support frame member 504 and lip 114 is seated in second ledge 62 in frame member 672. Nut 104 is positioned in slot 32 in upper face 512 of second support frame member 504 such that bolt receiving bores 98 in the left corner piece 26 are axially aligned with threaded apertures 170 in nut 104. Bolts 190 are inserted into bolt receiving bores 98 through horizontal plate member 94 and threaded into corresponding threaded apertures 170 in nut 104. As bolts 190 are threaded into corresponding threaded apertures 170 in nut 104, central abutment wall 168 of nut 102 is drawn towards and engages abutment wall 42. Similarly, third abutment wall 186 of nut 104 is drawn towards and engages second inner abutment wall 48. In addition, first and second abutment walls 164 and 182, respectively, of nut 102 slidably engage second outer abutment wall 46 and first inner abutment wall 44, respectively. Likewise, a second nut 104 is positioned in slot 32 in face 30c of frame member 672 such that bolt receiving bores 106 in the left corner piece 26 are axially aligned with threaded apertures 170 in the second nut 104. Bolts 190 are inserted into bolt receiving bores 106 through vertical plate member 96 and threaded into corresponding threaded apertures 170 in nut 104. As bolts 190 are threaded into corresponding threaded apertures 170 in nut 104, central abutment wall 168 of nut 102 is drawn towards and engages abutment wall 42. Similarly, third abutment wall 186 of nut 104 is drawn towards and engages second inner abutment wall 48. In addition, first and second abutment walls 164 and 182, respectively, of nut 104 slidably engage second outer abutment wall 46 and first inner abutment wall 44, respectively. As described, left corner piece 26 locks face 30c of frame member 672 and upper face 512 of second support frame member 504 together in multiple planes, thereby preventing frame member 672 and second support frame member 504 from pivoting with respect to each other.

Slide 670 includes an elongated bar 674 having a generally I-shaped cross section. Bar 674 is defined by a generally flat inner face 676, a generally flat outer face 678, first and second sides 680 and 682, respectively, and first and second opposite ends 684 and 686, respectively. First and second sides 680 and 682, respectively, include corresponding grooves 688 and 690, respectively, therein. Grooves 688 and 690 extend longitudinally from first end 684 to second end 686 of bar 674 and lie in a common plane. Groove 688 is defined by recessed surface 689 having first and second diverging sidewalls 691 and 693, respectively, projecting therefrom and terminating at side 680. Similarly, groove 690 is defined by recessed surface 695 having first and second diverging sidewalls 697 and 699, respectively, projecting therefrom and terminating at side 682.

Bar 674 further includes a plurality of axially aligned, outwardly extending, spaced, bolt receiving bores 692 formed therethrough from its outer face 678 to its inner face 676 through which corresponding bolts 694 extend into slot 32 in face 30a of support member 672. Each bore 692 is disposed at an acute angle with respect to outer face 678. Again, this acute angle may be anywhere between 1° and 89°, but is preferably between about 30° and about 80°, and is most preferably about 65°. In order to interconnect bar 674 to face 30a of frame member 672, side 680 of bar 674 is positioned against lip 701 projecting from face 30a of frame member 672. Nuts 104 are positioned in slot 32 in face 30a of frame member 672 such that bolt receiving bores 692 are axially aligned with threaded apertures 170 in corresponding nuts 104. Bolts 694 are inserted into bolt receiving bores 692 through bar 674 and threaded into corresponding threaded apertures 170 in nut 104. As bolts 694 are threaded into corresponding threaded apertures 170 in nut 104, central abutment wall 168 of nut 104 is drawn towards and engages abutment wall 42. Similarly, third abutment wall 186 of nut 104 is drawn towards and engages second inner abutment wall 48. In addition, first and second abutment walls 164 and 182, respectively, of nut 104 slidably engage second outer abutment wall 46 and first inner abutment wall 44, respectively. As nuts 104 are tightened onto bolts 694, it can be appreciated 1) bar 674 is secured to frame member 672 and; and 2) bar 674 is clamped again lip 701, thereby locking bar 674 to frame member 672 in multiple planes.

Figure 18:
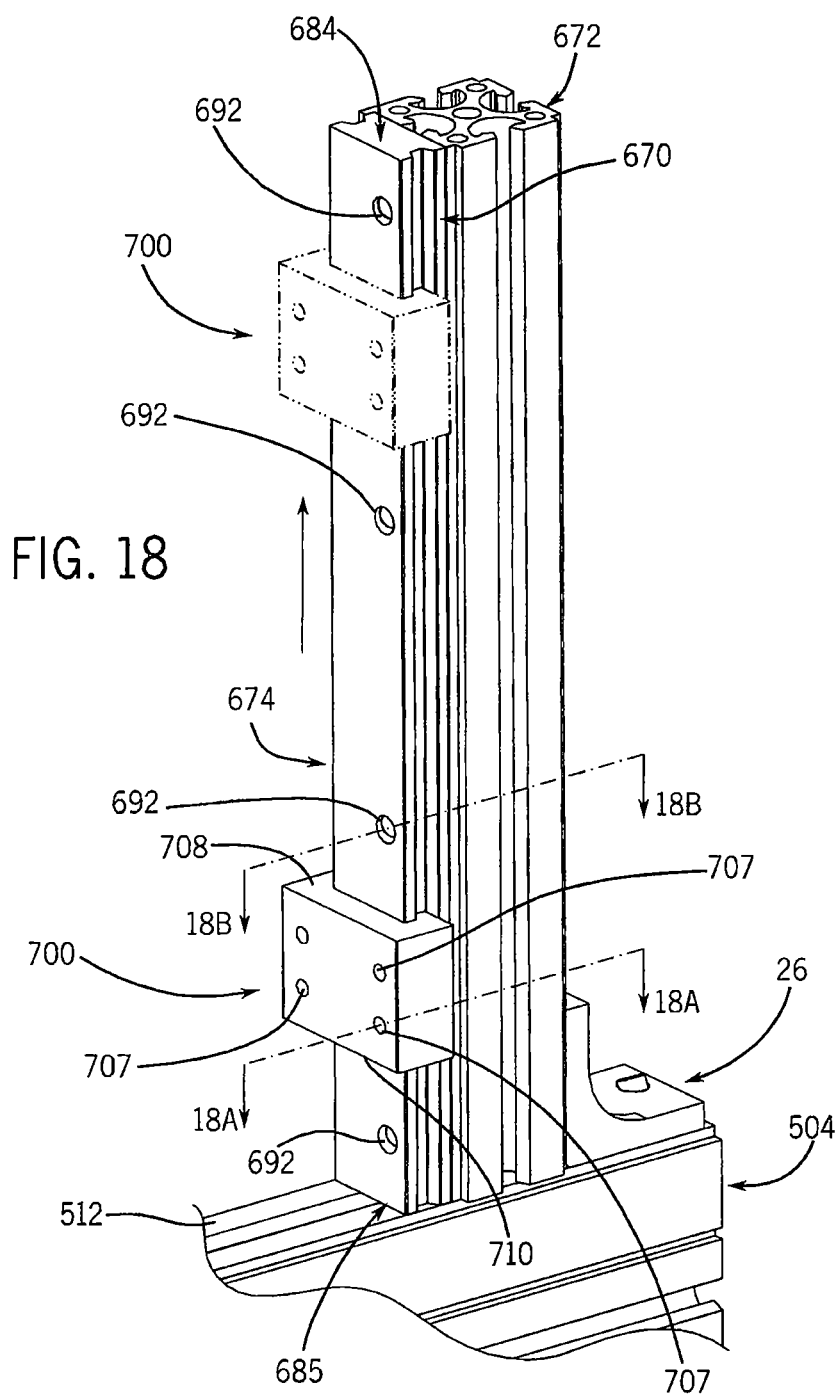
FIG. 18 is an enlarged isometric view of the assembled frame taken along line 18-18 of FIG. 1.
Figure 18A:
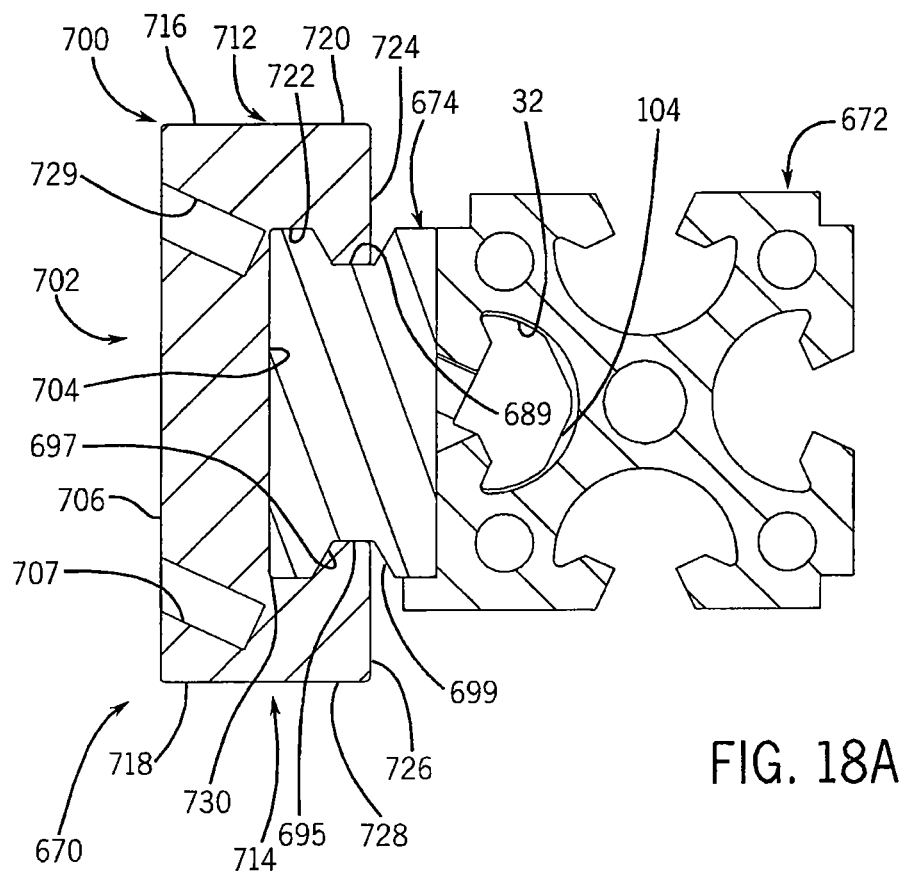
FIG. 18A is a cross sectional view of the assembled frame taken along line 18A-18A of FIG. 18.
Figure 18B:
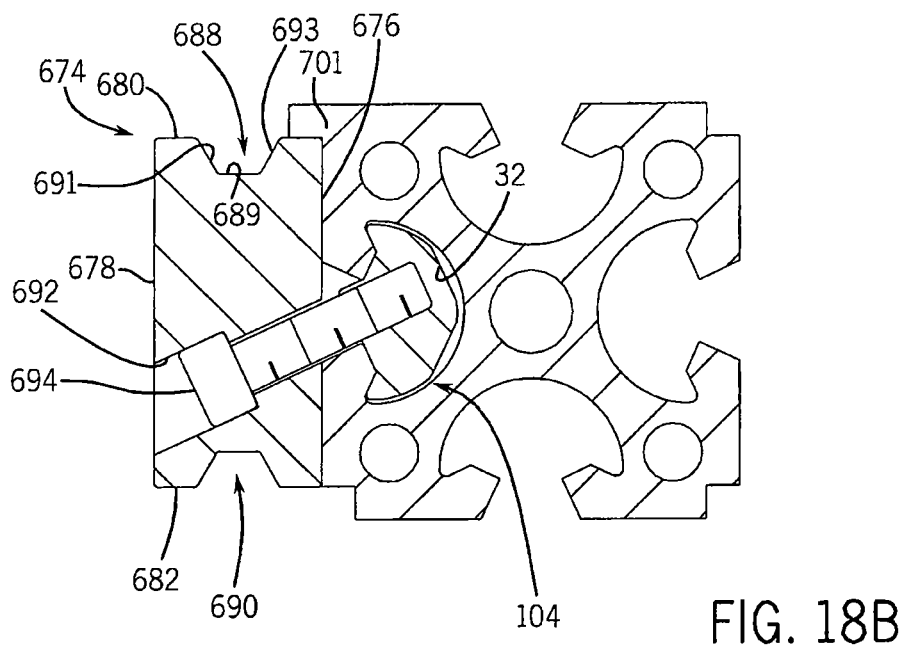
FIG. 18B is a cross sectional view of the assembled frame taken along line 18B-18B of FIG. 18.
Figure 19:
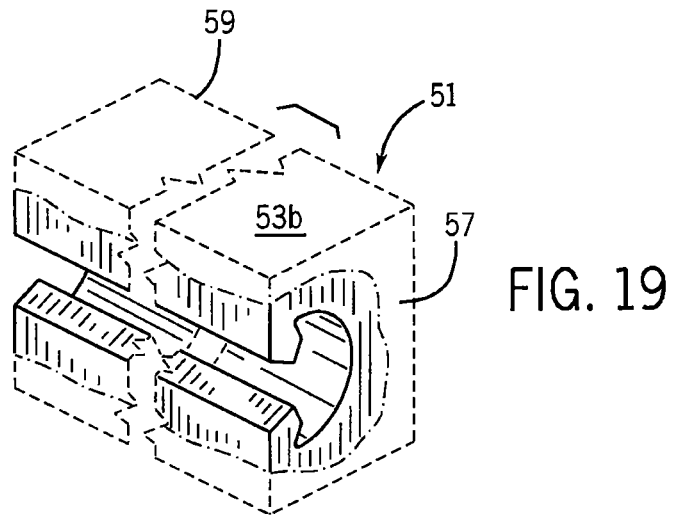
FIG. 19 is an isometric view of an alternate embodiment of a frame member in accordance with the present invention.
Figure 20:
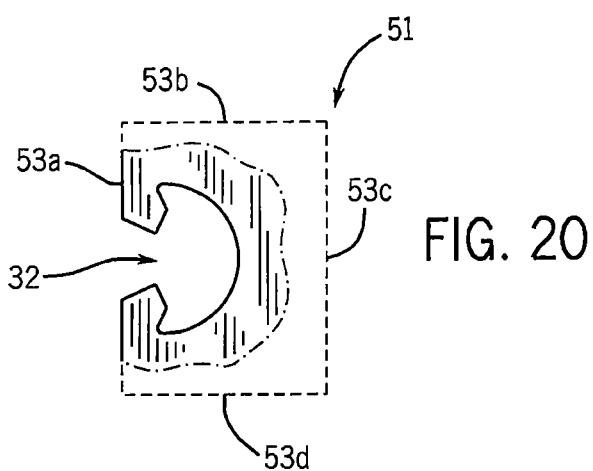
FIG. 20 is an end view of the frame member of FIG. 19.
Figure 21:
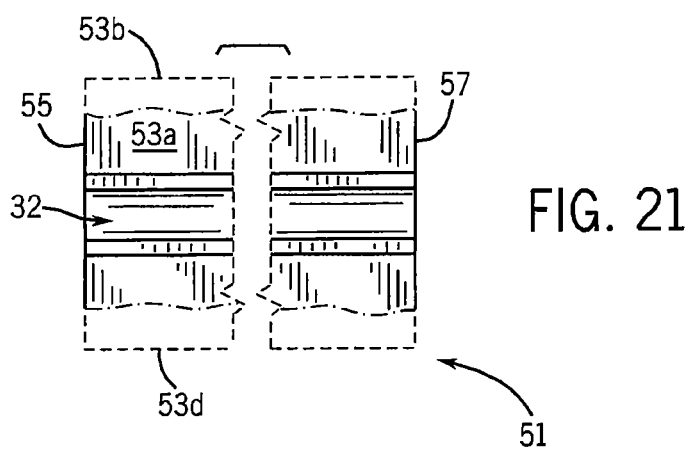
FIG. 21 is a front elevational view of the frame member of FIG. 20.
Figure 22:
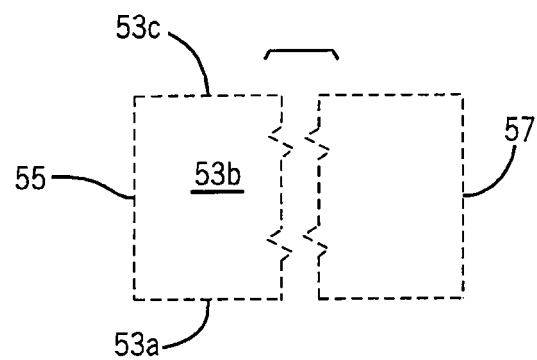
FIG. 22 is a top plan view of the frame member of FIG. 19.
Figure 23:
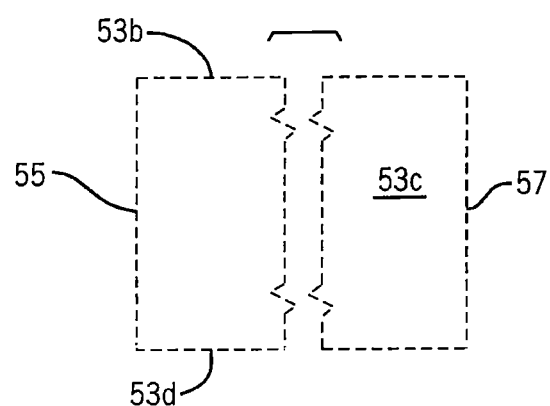
FIG. 23 is rear elevational view of the frame member of FIG. 19.

One or more generally C-shaped sliding elements 700 are slidably received on bar 674, FIG. 18. Each sliding element 700 includes a generally rectangular base 702 having an inner surface 704 and an outer surface 706. A plurality of bores 707 may be provided in outer surface 706 of sliding element 700 to interconnect sliding element 700 to desired item, such a desk drawer or the like, which a user intends to slide along frame member 672, as hereinafter described. Inner and outer surfaces 704 and 706, respectively, of sliding element 700 are interconnected by generally planar sides 708 and 710. Legs 712 and 714 project from inner surface 704 at opposite ends 716 and 718 of base 702 and terminate at corresponding end surfaces 724 and 726, respectively. Leg 712 includes an outer surface 720 generally co-planar with end 716 of base 716 and an inner surface 722 which intersects and is perpendicular to inner surface 704 of base 702. Similarly, leg 714 includes an outer surface 728 generally co-planar with end 718 of base 716 and an inner surface 730 which intersects and is perpendicular to inner surface 704 of base 702. Sliding element 700 further includes guides 732 and 734 extending from corresponding inner surfaces 722 and 730 of legs 712 and 714, respectively, and terminating at corresponding end surfaces 736 and 738, respectively. End surfaces 736 and 738 of guides 732 and 734, respectively, are interconnected to inner surfaces 722 and 730 of legs 712 and 714, respectively, by guide surfaces 740 and 742, respectively, which diverge from inner surface 704 of base 702.

End surface 736 and guide surface 740 of guide 732 form slidable interfaces with recessed surface 689 and first sidewall 691 defining groove 688 in first side 680 of bar 674. Likewise, end surface 738 and guide surface 742 of guide 734 form slidable interfaces with recessed surface 695 and first sidewall 697 defining groove 690 in second side 682 of bar 674. As described, guides 732 and 734 retain sliding element 700 on bar 674 and guide movement of sliding element 700 along bar 674 along the length thereof.

Various modes of carrying out the invention are contemplated as being within the scope of the following claims particularly pointing out and distinctly claiming the subject matter, which is regarded as the invention.

The invention claimed is:

1. A corner assembly, comprising:
 first and second frame members, each frame member including:
  a generally flat, elongated first surface having an elongated slot therein extending along an axis, the slot being defined by:
   first and second generally flat, converging sidewalls, the first and second converging sidewalls lying in corresponding planes which are at acute angles to the surface and having terminal ends;
   first and second diverging outer abutment walls which extend from the terminal ends of the first and second converging sidewalls and have terminal ends, the first and second diverging outer abutment walls being non-parallel to the first surface;
   first and second diverging inner abutment walls extending from the terminal ends of the first and second outer diverging sidewalls toward the surface, the first and second diverging inner abutment walls having terminal ends; and
   a generally concave terminal wall interconnecting the terminal ends of the first and second diverging inner abutment walls; and
 a corner piece for interconnecting the first and second frame members, the corner piece including:
  a first plate member defining an inner face, an opposite outer face, a first side face, an opposite second side face, and an end face, the first plate member including a bolt-receiving bore therethrough extending along a first axis at an acute angle to the inner face; and
  a second plate member defining an inner face contiguous with the inner face of the first plate member, an outer face, a first side face, an opposite second side face, and an end face, the second plate member including a bolt-receiving bore extending between the inner face and the outer face thereof along a second axis at an acute angle to the inner face thereof and generally parallel to the inner face of the first plate member.

2. The corner assembly of claim 1 wherein the bolt-receiving bore through the first plate member extends between the inner face and the outer face of the first plate member along a second axis generally parallel to the inner face of the second plate member.

3. The corner assembly of claim 2 wherein:
 the bolt-receiving bore through the first plate member is a first bolt-receiving bore; and
 the first plate member includes a second bolt-receiving bore therethrough.

4. The corner assembly of claim 3 wherein the second bolt-receiving bore through the first plate member extends between the inner face and the lower face of the first plate member along a third axis generally parallel to the inner face of the second plate member.

5. The corner assembly of claim 1 wherein;
 the bolt-receiving bore through the second plate member is a first bolt-receiving bore; and
 the second plate member including a second bolt-receiving bore between the inner face and the outer face thereof along a second axis generally parallel to the inner face of the first plate member.

6. The corner assembly of claim 1 wherein the corner piece includes a gusset interconnecting the inner face of the second plate member and the inner face of the first plate member.

7. The corner assembly of claim 1 wherein the outer face of the second plate member is contiguous with the outer face of the first plate member.

8. The corner assembly of claim 1 wherein the first side face of the second plate member is contiguous with the first side face of the first plate member.

9. The corner assembly of claim 1 wherein corner piece includes a first lip projecting outwardly from the outer face of the first plate member.

10. The corner assembly of claim 9 wherein corner piece includes a second lip projecting from the outer face of the second plate member.

11. A corner assembly, comprising:
 first and second frame members, each frame member including
  a generally flat, elongated first surface having an elongated slot therein extending along an axis, the slot being defined by
   first and second generally flat, converging sidewalls, the first and second converging sidewalls lying in corresponding planes which are at acute angles to the surface and having terminal ends;

first and second diverging outer abutment walls which extend from the terminal ends of the first and second converging sidewalls and have terminal ends, the first and second diverging outer abutment walls being non-parallel to the first surface;

first and second diverging inner abutment walls extending from the terminal ends of the first and second outer diverging sidewalls toward the surface, the first and second diverging inner abutment walls having terminal ends; and a generally concave terminal wall interconnecting the terminal ends of first and second diverging inner abutment walls; and a corner piece for interconnecting the first and second frame members, the corner piece including:

a first plate member defining an inner face and an opposite outer face, the first plate member including a bolt-receiving bore extending between the inner face and the outer face of the first plate member along a first axis; and a second plate member operatively connected to the first plate member and defining an inner face and an outer face, the second plate member including a bolt-receiving bore extending between the inner face and the outer face thereof along a second axis generally parallel to the inner face of the first plate member;

wherein the first axis is generally parallel to the inner face of the second plate member.

12. The corner assembly of claim 11 wherein:

the bolt-receiving bore through the first plate member is a first bolt-receiving bore; and the first plate member includes a second bolt-receiving bore therethrough.

13. The corner assembly of claim 12 wherein the second bolt-receiving bore through the first plate member extends between the inner face and the lower face of the first plate member along a third axis generally parallel to the inner face of the second plate member.

14. The corner assembly of claim 13 wherein:

the bolt-receiving bore through the second plate member is a first bolt-receiving bore; and the second plate member including a second bolt-receiving bore between the inner face and the outer face thereof along a fourth axis generally parallel to the inner face of the first plate member.

15. The corner assembly of claim 11 further comprising a gusset interconnecting the inner face of the second plate member and the inner face of the first plate member.

16. The corner assembly of claim 11 wherein the outer face of the second plate member is contiguous with the outer face of the first plate member.

17. The corner assembly of claim 11 wherein corner piece includes a first lip projecting outwardly from the outer face of the first plate member.

18. The corner assembly of claim 17 wherein corner piece includes a second lip projecting from the outer face of the second plate member.

19. A corner assembly, comprising:

first and second frame members, each frame member including a generally flat, elongated first surface having an elongated slot therein extending along an axis, the slot being defined by:

first and second generally flat, converging sidewalls, the first and second converging sidewalls lying in corresponding planes which are at acute angles to the surface and having terminal ends;

first and second diverging outer abutment walls which extend from the terminal ends of the first and second converging sidewalls and have terminal ends, the first and second diverging outer abutment walls being non-parallel to the first surface;

first and second diverging inner abutment walls extending from the terminal ends of the first and second outer diverging sidewalls toward the surface, the first and second diverging inner abutment walls having terminal ends; and a generally concave terminal wall interconnecting the terminal ends of the first and second diverging inner abutment walls; and a corner piece for interconnecting the first and second frame members, the corner piece including:

a first plate member defining an inner face and an opposite outer face, the first plate member including:

a first bolt-receiving bore extending between the inner face and the outer face of the first plate member along a first axis; and a second bolt-receiving bore extending between the inner face and the outer face of the first plate member along a second axis;

a second plate member operatively connected to the first plate member and defining an inner face and an outer face, the second plate member including:

a first bolt-receiving bore extending between the inner face and the outer face thereof along a third axis generally parallel to the inner face of the first plate member; and a second bolt-receiving bore extending between the inner face and the outer face thereof along a fourth axis generally parallel to the inner face of the first plate member; and a gusset interconnecting the inner face of the second plate member and the inner face of the first plate member;

wherein the first and second axes are generally parallel to the inner face of the second plate member.

20. The corner assembly of claim 19 wherein the inner face of the second plate member is contiguous with the inner face of the first plate member.

21. The corner assembly of claim 19 wherein the outer face of the second plate member is contiguous with the outer face of the first plate member.

22. The corner assembly of claim 19 wherein the corner piece includes a first lip projecting outwardly from the outer face of the first plate member.

* * * * *